(12) United States Patent
Tsirtsis et al.

(10) Patent No.: US 11,991,775 B2
(45) Date of Patent: May 21, 2024

(54) MESSAGE ORDERING FOR NETWORK BASED MOBILITY MANAGEMENT SYSTEMS

(71) Applicant: QUALCOMM Incorporated, San Diego, CA (US)

(72) Inventors: Georgios Tsirtsis, London (GB); Vincent Douglas Park, Alexandria, VA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/520,508

(22) Filed: Nov. 5, 2021

(65) Prior Publication Data

US 2022/0060879 A1 Feb. 24, 2022

Related U.S. Application Data

(60) Continuation of application No. 15/931,004, filed on May 13, 2020, now Pat. No. 11,463,861, which is a
(Continued)

(51) Int. Cl.
*G06F 15/173* (2006.01)
*H04L 43/106* (2022.01)
(Continued)

(52) U.S. Cl.
CPC ............. *H04W 8/02* (2013.01); *H04L 43/106* (2013.01); *H04L 45/02* (2013.01); *H04L 45/22* (2013.01);
(Continued)

(58) Field of Classification Search
CPC ..... H04W 8/02; H04W 80/04; H04W 88/182; H04L 43/106; H04L 45/02; H04L 45/22; H04L 47/34
See application file for complete search history.

(56) References Cited

U.S. PATENT DOCUMENTS 5,414,833 A 5/1995 Hershey et al.
5,572,528 A 11/1996 Shuen
(Continued)

FOREIGN PATENT DOCUMENTS

EP 1011243 A1 6/2000
JP 2000183972 A 6/2000
(Continued)

OTHER PUBLICATIONS

Arkko J et al: "Secure Neighbor Discovery (SEND); RFC 3971" Internet Engineering Task Force (IETF), (Mar. 2005).
(Continued)

*Primary Examiner* — John B Walsh
(74) *Attorney, Agent, or Firm* — Muncy, Geissler, Olds & Lowe, P.C

(57) ABSTRACT

The claimed subject matter relates to systems and methods for processing messages in a wireless communications environment. In an aspect, a communications method is provided. The method includes initiating a registration with a network domain node and generating sequence information with respect to the registration. The sequence information is then employed to facilitate further communications with the network domain node.

27 Claims, 14 Drawing Sheets

Related U.S. Application Data continuation of application No. 15/182,247, filed on Jun. 14, 2016, now Pat. No. 10,681,530, which is a division of application No. 11/968,576, filed on Jan. 2, 2008, now Pat. No. 9,392,434.

(60) Provisional application No. 60/885,983, filed on Jan. 22, 2007.

(51) Int. Cl.
*H04W 8/02* (2009.01)
*H04L 45/00* (2022.01)
*H04L 45/02* (2022.01)
*H04L 47/34* (2022.01)
*H04W 80/04* (2009.01)
*H04W 88/18* (2009.01)

(52) U.S. Cl.
CPC ............. *H04L 47/34* (2013.01); *H04W 80/04* (2013.01); *H04W 88/182* (2013.01)

(56) References Cited

U.S. PATENT DOCUMENTS

| | | |
|---|---|---|
| 5,729,537 A | 3/1998 | Billstrom |
| 5,740,437 A | 4/1998 | Greenspan et al. |
| 6,026,165 A | 2/2000 | Marino et al. |
| 6,201,962 B1 | 3/2001 | Sturniolo et al. |
| 6,311,058 B1 | 10/2001 | Wecker et al. |
| 6,321,093 B1 | 11/2001 | Dalal |
| 6,445,922 B1 | 9/2002 | Hiller et al. |
| 6,493,342 B1 | 12/2002 | Breslow et al. |
| 6,654,359 B1 | 11/2003 | La Porta et al. |
| 6,690,659 B1 | 2/2004 | Ahmed et al. |
| 6,857,067 B2 | 2/2005 | Edelman |
| 6,934,545 B2 | 8/2005 | Sugimoto |
| 6,947,401 B2 | 9/2005 | El-Malki et al. |
| 7,054,296 B1 | 5/2006 | Sorrells et al. |
| 7,130,629 B1 | 10/2006 | Leung et al. |
| 7,152,238 B1 | 12/2006 | Leung et al. |
| 7,239,618 B1 | 7/2007 | La Porta et al. |
| 7,532,593 B2 | 5/2009 | Shirokura et al. |
| 7,590,710 B1 | 9/2009 | Kokal et al. |
| 7,600,040 B1 | 10/2009 | Henry et al. |
| 7,633,915 B1 * | 12/2009 | Lewis ............... H04W 4/20 370/332 |
| 7,805,140 B2 | 9/2010 | Friday et al. |
| 7,831,686 B1 | 11/2010 | Tran et al. |
| 9,392,434 B2 | 7/2016 | Tsirtsis et al. |
| 10,009,736 B1 * | 6/2018 | Chu ............... H04W 12/03 |
| 10,681,530 B2 | 6/2020 | Tsirtsis et al. |
| 2001/0046223 A1 | 11/2001 | Malki et al. |
| 2002/0091874 A1 | 7/2002 | Jones et al. |
| 2002/0102987 A1 | 8/2002 | Souisse et al. |
| 2002/0133534 A1 | 9/2002 | Forslow |
| 2003/0067921 A1 | 4/2003 | Sivalingham |
| 2003/0087647 A1 * | 5/2003 | Hurst ............... H04W 64/00 455/456.1 |
| 2003/0161287 A1 | 8/2003 | Venkitaraman et al. |
| 2004/0103282 A1 | 5/2004 | Meier et al. |
| 2004/0162819 A1 | 8/2004 | Omae et al. |
| 2004/0184424 A1 | 9/2004 | Shibata et al. |
| 2004/0202329 A1 | 10/2004 | Jung et al. |
| 2004/0243680 A1 | 12/2004 | Mayer |
| 2005/0010750 A1 | 1/2005 | Ward et al. |
| 2005/0078957 A1 | 4/2005 | Hendow |
| 2005/0101321 A1 | 5/2005 | Ikeda et al. |
| 2005/0113070 A1 | 5/2005 | Okabe |
| 2005/0147062 A1 | 7/2005 | Khouaja et al. |
| 2005/0169056 A1 | 8/2005 | Berkman et al. |
| 2005/0195750 A1 | 9/2005 | Le et al. |
| 2005/0198337 A1 | 9/2005 | Sun et al. |
| 2006/0013398 A1 | 1/2006 | Halasz et al. |
| 2006/0019692 A1 | 1/2006 | Huh et al. |
| 2006/0068750 A1 | 3/2006 | Burr |
| 2006/0077988 A1 | 4/2006 | Cheng et al. |
| 2006/0080460 A1 | 4/2006 | Kobayashi et al. |
| 2006/0203823 A1 | 9/2006 | Jiang |
| 2006/0209760 A1 | 9/2006 | Saito et al. |
| 2006/0209891 A1 | 9/2006 | Yamada et al. |
| 2006/0215594 A1 | 9/2006 | Shirokura et al. |
| 2006/0221918 A1 | 10/2006 | Wang |
| 2007/0043862 A1 | 2/2007 | Luo |
| 2007/0174443 A1 | 7/2007 | Shaheen et al. |
| 2007/0189219 A1 | 8/2007 | Navali et al. |
| 2007/0189279 A1 | 8/2007 | Thalanany et al. |
| 2007/0195791 A1 | 8/2007 | Bosch et al. |
| 2007/0223435 A1 | 9/2007 | Mitsuhori |
| 2007/0223667 A1 | 9/2007 | Mitsuhori |
| 2007/0263559 A1 | 11/2007 | Gossain et al. |
| 2007/0268896 A1 | 11/2007 | Oyama et al. |
| 2007/0294758 A1 | 12/2007 | Berg et al. |
| 2007/0297377 A1 | 12/2007 | McCann et al. |
| 2008/0002594 A1 | 1/2008 | Forsberg et al. |
| 2008/0130571 A1 | 6/2008 | Maeda et al. |
| 2008/0167037 A1 | 7/2008 | Bedekar et al. |
| 2008/0182576 A1 | 7/2008 | Tsirtsis et al. |
| 2008/0207168 A1 | 8/2008 | Forsberg |
| 2008/0256220 A1 | 10/2008 | Bachmann et al. |
| 2008/0293413 A1 | 11/2008 | Sharif-Ahmadi et al. |
| 2008/0316979 A1 | 12/2008 | Laroia et al. |
| 2009/0070030 A1 | 3/2009 | Isoda et al. |
| 2009/0092953 A1 | 4/2009 | Yang et al. |
| 2010/0011426 A1 | 1/2010 | Falk et al. |
| 2010/0296481 A1 | 11/2010 | Weniger et al. |
| 2020/0275253 A1 | 8/2020 | Tsirtsis et al. |

FOREIGN PATENT DOCUMENTS

| | | |
|---|---|---|
| JP | 2000183975 A | 6/2000 |
| JP | 2002112310 A | 4/2002 |
| JP | 2003008625 A | 1/2003 |
| JP | 2004129210 A | 4/2004 |
| JP | 2004274733 A | 9/2004 |
| JP | 2005159495 A | 6/2005 |
| JP | 2006141023 A | 6/2006 |
| JP | 2006148579 A | 6/2006 |
| WO | 2004001520 A2 | 12/2003 |
| WO | 2006118540 A2 | 11/2006 |

OTHER PUBLICATIONS

D. Johnson, Rice University: C Perkins, Nokia Research Center; J. Arkko, Ericsson; "Mobility Support in IPv6": Jun. 2004, Network Working Group, Request for Comments, 3775, Category: Standards Track; http/tools.ietf.org/html/rfc3775.

Droms R., "Dynamic Host Configuration Protocol," IETF Standard, RFC 2131, Internet Engineering Task Force, IETF, CH, Mar. 1997), XP015007915, pp. 1-45.

European Search Report—EP18177386—Search Authority—Munich—dated Aug. 21, 2018.

Gundavelli S: "Proxy Mobile IPv6; draft-sgundave-mip6-proxymip6-01.txt" Internet Engineering Task Force (IETF) Draft, (Jan. 5, 2007).

Hsu Ching-Fang, et al., "Performance Analysis of Deflection Routing in Optical Burst-Switched Networks", Proceedings IEEE Twenty-First Annual Joint Conference of the IEEE Computer and Communications Societies, INFOCOM 2002, 2002, vol. 1, 66-73.

International Preliminary Report on Patentability—PCT/US2008/051723, The International Bureau of WIPO—Geneva, Switzerland, dated Aug. 8, 2008.

International Search Report—PCT/US08/051723, International Search Authority—European Patent Office—dated Aug. 8, 2008.

Patel A., et al., "Authentication Protocol for Mobile IPv6", Jan. 2006, pp. 1-20.

Perkins C., et al., "IP Mobility Support for IPv4-rfc3344.txt" IETF'Standard Internet Engineering Task Force, IETF, CH, Aug. 1, 2002 (Aug. 1, 2002), XP015009105 ISSN: 0000-0003 abstract paragraphs [01.5], [01.6], [3.6.1.1].

Perkins C.E., et al.,"Mobile Networking Through Mobile IP", IEEE Internet Computing, Feb. 1998, pp. 58-69.

(56) References Cited

OTHER PUBLICATIONS

Proxy MobileiPv6, draft-Ietf-netlmm-proxymip6-01 txt, Jun. 18, 2007. S. Gundavelli, K. Leung, Cisco, V. Devarapalli, Azaire Networks, K Chowdhuty, Starent Networks, B. Path, Nokia Siemens Networks http://tools.leftorg/html/draft-Ietf-netimm-proxymip6-01.
Taiwan Search Report—TW097102372—TIPO—dated Jul. 26, 2012.
Templin F et al: Network Localized Mobility Management Using DHCP; draft-templinautoconf-netlmm-dhcp-04.txt Internet Engineering Task Force (IETF) Draft, (Oct. 23, 2006), p. 16.
Wikipedia—Mobile Device Printed on May 28, 2013 from http://simple.wikipedia.org/wiki/Mobile_device, pp. 1-2.
Wikipedia—"Mobile device". Printed on May 28, 2013, http://en.wikipedia.org/wiki/Mobile_device, pp. 1-2.
Written Opinion—PCT/US08/051723, International Search Authority—European Patent Office—dated Aug. 8, 2008.

\* cited by examiner

PRIOR ART FIG. 10

MESSAGE ORDERING FOR NETWORK BASED MOBILITY MANAGEMENT SYSTEMS

CLAIMS OF PRIORITY

The present Application for Patent is a continuation of U.S. patent application Ser. No. 15/931,004, entitled "MESSAGE ORDERING FOR NETWORK BASED MOBILITY MANAGEMENT SYSTEMS," filed May 13, 2020, which is a continuation application of U.S. patent application Ser. No. 15/182,247, entitled "MESSAGE ORDERING FOR NETWORK BASED MOBILITY MANAGEMENT SYSTEMS," filed Jun. 14, 2016, which is a divisional application of U.S. patent application Ser. No. 11/968,576, issued as U.S. Pat. No. 9,392,434, entitled "MESSAGE ORDERING FOR NETWORK BASED MOBILITY MANAGEMENT SYSTEMS," filed Jan. 2, 2008, which claims the benefit of U.S. Provisional Application No. 60/885,983, entitled "A METHOD AND APPARATUS FOR MOBILITY MANAGEMENT MESSAGE ORDERING," filed Jan. 22, 2007, each of which is incorporated herein by reference in its entirety.

BACKGROUND

Field

The following description relates generally to communications systems, and more particularly to ordering of registration messages to access points that are in a communication with a mobile device.

Background

Communication networks, such as wireless communication networks, broadband networks, and other suitable networks are utilized in connection with transferring data, wherein data can include word processing files, streaming video, multimedia files, voice data, and/or the like. Such networks are often employed with protocols such as Internet Protocol (IP) for transferring data in accordance with a public network such as the Internet. An extension of IP protocols relates to mobile devices and is known as Mobile Internet Protocol (MIP). Another variant is Proxy Mobile Internet Protocol (PMIP). Such mobile protocols are often employed with a network domain that includes nodes such as access nodes and Local Mobility Anchors (LMA) for example that often employ the mobile IP protocols in conjunction with a domain protocol to manage the respective devices within the domain.

One such domain protocol is referred to as a Network-based Localized Mobility Management (NETLMM) protocol. In contrast to MIP protocol which is considered a global mobility management protocol to control IP links as communications devices change location, NETLMM and PMIP help localize the management of topologically small device movements. Limiting the reach of the respective protocol responsibilities is more preferable to handle local movements since protocol complexities are reduced. Generally, NETLMM provides for efficient support for mobile nodes communicating with peers both outside and inside the same mobility domain when mobile nodes move across different access routers (or nodes, or points). These movements typically require no extra host stack support or complex security and signaling interactions between mobile node and the respective access network. By utilizing the neighbor access router information in the domain, NETLMM can achieve very fast and smooth handover performance to suit the requirements of most real-time and interactive multimedia applications.

Network based mobility management systems employing technologies such as NETLMM, PMIP are generally considered mobility management systems that do not require mobility management signaling from a mobile device to operate. Instead, the network or domain changes message routing within the network based on link layer or other triggers. A well understood limitation of such mechanisms is that they can only operate with mobiles that maintain a single link to the network. In other words the mobility management system points to a single point of attachment for each mobile. Since the mobile is assumed to have only one link with an NETLMM domain for example, at any one time the NETLMM protocol must ensure that the local mobility anchor (LMA) redirects the mobile device's traffic to the correct access router i.e., the access router the mobile is connected to. To perform this operation, access routers send registration messages to the LMA when a mobile device creates a link with the LMA. Assuming the mobile device can only have one link at the time, the order in which the registration messages reach the LMA is assumed to be the same as the order in which the mobile device creates links with different access routers. This assumption can hold if the movement between access routers is not very frequent. More specifically, the assumption holds when the time between link creations is larger than the time it takes for the access router to register with the LMA.

Referring to prior art FIG. 10, an example domain 1000 is illustrated. The domain 1000 includes an LMA 1010 that communicates with access nodes (AN) (or routers) 1020 and 1030. The AN's 1020,1030 communicate with access point (AP) groups 1040 and 1050 respectively, where such groups may service a mobile device 1060. The mobile device 1060 maintains a link with Access Point 2 (AP2) 1070, which is directly connected to the AN at 1020. In this example, NETLMM protocol schemes work relatively well since only movement between ANs 1020 and 1030 is triggering NETLMM device registrations, while movement between APs at 1040 or 1050 under the same AN 1020 or 1030 do not trigger such registrations. Even in this case, however, movement between AP2 at 1070 and AP4 at 1080 can cause out of order delivery of the registrations to the LMA 1010, if for example the mobile device moves too fast or if it moves back and forth between AP2 1070 and AP4 1080, a condition commonly referred to as "ping-pong." As can be appreciated, back and forth movements can cause communications problems within the domain 1000.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Message ordering principles are applied to network-based mobility management systems and protocols to facilitate orderly communications within a network or domain. During registration of a communication channel between a mobile device and a node in the domain such as a Local Mobility Anchor (LMA) for example, sequential information can be applied to the registration to facilitate ordering of messages in the domain and with respect to the mobile device. Sequential information can take the form of a sequence number or timestamp information for example that can be assigned by the device or proxy node within the domain. When an initial communication commences with the LMA, the sequence number can be assigned to a registration occurring between the LMA and the mobile device. Upon movement of a device where other access nodes or access points become involved, a subsequent registration can occur with the LMA. During the subsequent registration, the previous sequence number can be incremented and employed for the subsequent registration. The LMA or other controlling node then employs the sequence number to track where messages should be routed across the domain and in view of the respective sequence number received. In this manner, out of order delivery problems associated with prior systems and protocols is mitigated.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate message ordering in network-based mobility management systems. In an aspect, a communications method is provided. The method includes initiating a registration with a network domain node and generating sequence information with respect to the registration. The sequence information is then employed to facilitate further communications with the network domain node. The network domain node can be a Local Mobility Anchor for example, operating with such example protocols as proxy mobile Internet Protocol and Network-based localized mobility management protocol.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
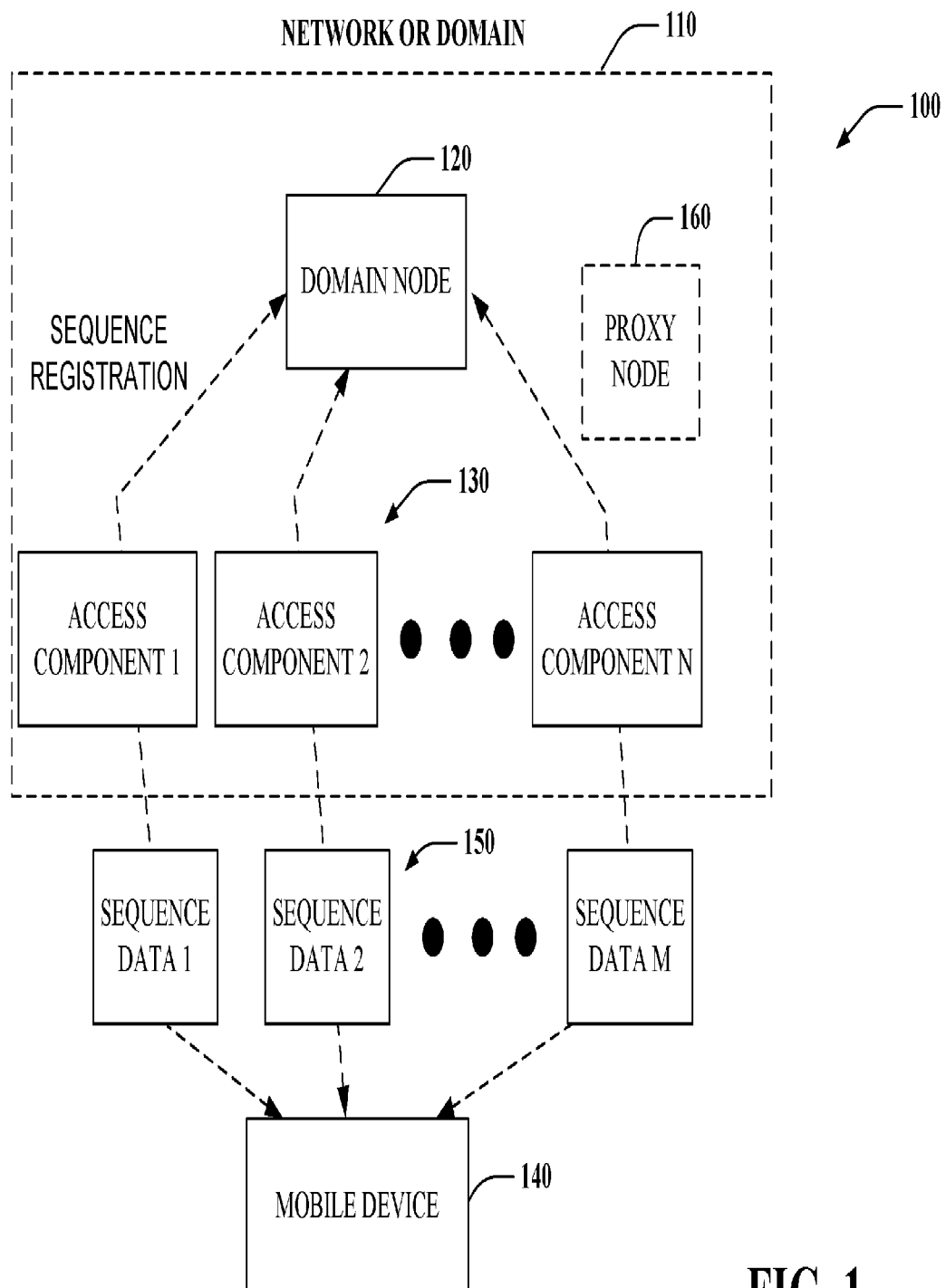
FIG. 1 is a high level block diagram of a system that is provided to illustrate message ordering in a communications environment.

Referring now to FIG. 1, a system 100 illustrates message ordering principles in a communications environment. A network or domain 110 includes at least one domain node 120 that communicates to one or more access components 130, where the access components can include interface points to the domain such as access nodes, access routers, base stations, and so forth. A mobile device 140 attempts to establish communications with the domain node 120 via the access components 130. For instance, the mobile device 140 may attempt to form a first communications link via a first access component at 130 and after moving to another location, the mobile device forms a subsequent link such as through a second access component at 130. As can be appreciated, a plurality of such communications links can be formed between the mobile device 140, access components 130, and the domain node 120. As illustrated, for the respective communications links formed between the mobile device 140 and the access components 130, a packet of sequence data 150 (per communications link) is generated by the device 140 when an initial communications link is formed. As shown, a proxy node 160 can be employed to cause switchovers between access components 130 based off of signal quality determinations for example and can also be employed to facilitate generation of the sequence data 150 as will be described in more detail below.

In general, the sequence data 150 can be employed for message ordering in a network-based mobility management system to facilitate orderly communications within the domain 110. During registration of a communication channel between the mobile device 140 and the domain node 120 in the domain 110 such as a Local Mobility Anchor (LMA)

for example, sequential information or data 150 can be applied to the registration to facilitate ordering of messages in the domain 110 and with respect to the mobile device 140. Sequential data 150 can take the form of a sequence number or timestamp information for example that can be assigned by the device 140 or proxy node 160 within the domain 110.

When an initial communication commences with the domain node 120, the sequence number 150 can be assigned to a registration occurring between the domain node 120 and the mobile device 140. Upon movement of the mobile device 140 where other access nodes or access components 130 become involved, a subsequent registration can occur with the domain node 120. During the subsequent registration, the previous sequence number can be incremented and employed for the subsequent registration. The domain node 120 or other controlling node then employs the sequence data 150 to track where messages should be routed across the domain 110 and in view of the respective sequence data received. In this manner, out of order delivery problems associated with prior systems and protocols is mitigated. As can be appreciated, sequence data 150 can take on many forms. Thus, incrementing data or decrementing data can be considered sequential. Similarly, as with timestamp data, the sequence data 150 does not have to employ consecutive sequence information as long as in increasing or decreasing pattern is observed (e.g., 1,2,3, 4, 5 . . . is sequential as is 13, 9, 7, 6, 2 . . . and so forth).

In one specific example, the system 100 can employ Proxy Mobile Internet Protocol (PMIP). Such mobile protocols are often employed with a network domain 110 that includes nodes such as access nodes and Local Mobility Anchors (LMA) for example that often employ the mobile IP protocols in conjunction with a domain protocol to manage the respective devices within the domain 110. One such domain protocol is referred to as a Network-based Localized Mobility Management (NETLMM) protocol. In one aspect, PMIP and NETLMM potentially suffer from out of order delivery of mobility management messages from different access components 130 to the domain node 120. If messages reach the domain node 120 out of order, the domain node can send traffic to the wrong access component 130. Thus, in one example, PMIP/NETLMM messages from the access components 130 are triggered by on the event of communication link creation as will be described in more detail with respect to FIG. 2. This can take different forms, including some form of an L2 connection request, e.g., Address Resolution Protocol (ARP), Neighbor Discovery (ND), Dynamic Host Configuration Protocol (DHCP) or other protocol. Whatever the protocol employed, an extension can be introduced in which the mobile device 140 or a network based proxy 160 provides a sequence data 150 (or timestamp). In this manner, the mobile device 140 (or its network proxy) indicates the order in which the communications links are created. The access components 130 then copy this sequence data 150 (or timestamp) in the mobility management message it sends to the LMA or domain node 120. The sequence data 150 allows the domain node 120 to detect out of order delivery of PMIP/NETLMM messages which prevents misdirection of traffic through the access components 130.

It is noted that the terminal or mobile device 140, can be, for instance, a module such as an SD card, a network card, a wireless network card, a computer (including laptops, desktops, personal digital assistants PDAs), mobile phones, smart phones, or any other suitable terminal that can be utilized to access a network. The mobile device 140 accesses the network by way of an access component 130. In one example, a connection between the mobile device 140 and the access components 130 may be wireless in nature, in which access components may be a base station and the mobile device may be a wireless terminal. For instance, the device 140 and access component 130 may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Similarly to the mobile device 140, the access components 130 can be an access node associated with a wired network or a wireless network. To that end, access component 130 can be, for instance, a router, a switch, or the like. The access component 130 can include one or more interfaces, e.g., communication modules, for communicating with other network nodes. Additionally, the access component 130 may be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
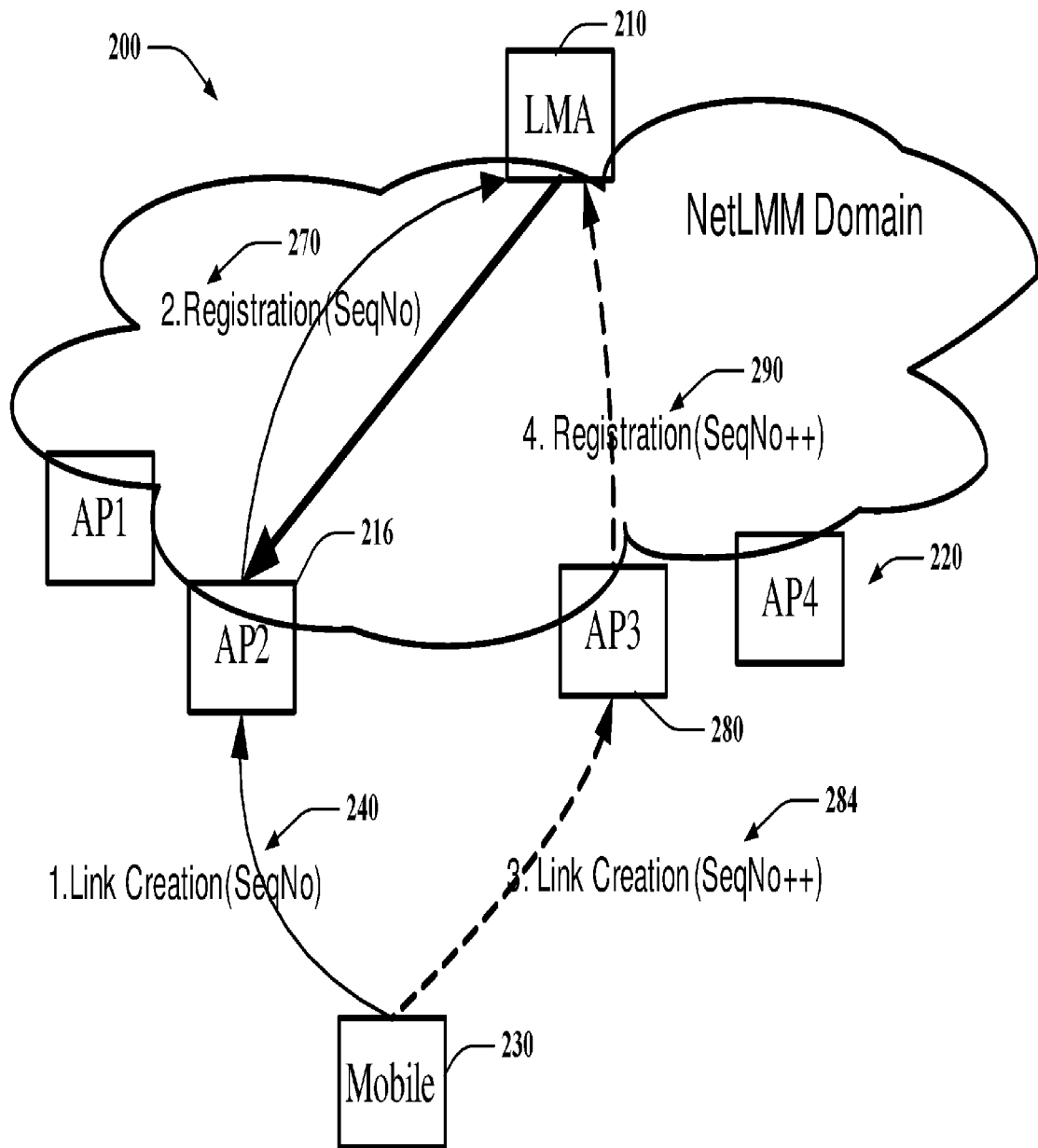
FIG. 2 is a block diagram of an example network access system that can employ sequence data to form communications links and facilitate message ordering.

Referring now to FIG. 2, an example network access system 200 is illustrated that can employ sequence data to form communications links and facilitate message ordering. The system 200 includes a local mobility anchor (LMA) 210 that communicates to one or more access points 220 to a mobile device 230. The system 200 employs a mobile specific Sequence Number to order registrations from different access points (or routers) 220 to the LMA 210. At 240, a sequence number is provided by the mobile itself device 230 of a network based proxy described below. The system 200 shows how sequence numbers such as shown at 240 can be employed for registration messages from an access point 2 (AP2) at 250 and an access point 3 (AP3) at 260 can be ordered. In this example, the mobile device 240 includes the Sequence Number in a link creation message at reference numeral 240.

The link creation message at 240 can be a message that triggers a NetLMM registration from the respective AP 220, for example although other protocols than NetLMM can be employed. The link creation message 240 is typically is a link layer message (e.g., a connection request), an ARP request message, a Neighbor Discovery message or other message that may be used to trigger such registrations. As shown at 270, a registration is formed with the LMA 210 based off the sequence number generated at 240. If the mobile is moved, where another access point 3 at 280 is involved, a subsequent link message can be created at 284 with a new sequence number, where the subsequent sequence information can be employed for a subsequent registration show at 290. The sequence numbers received by the registrations at 270 and 290 are then employed to facilitate orderly communications between the LMA 210 and the access point 2 at 250 and the access point 3 at 280.

Figure 3:
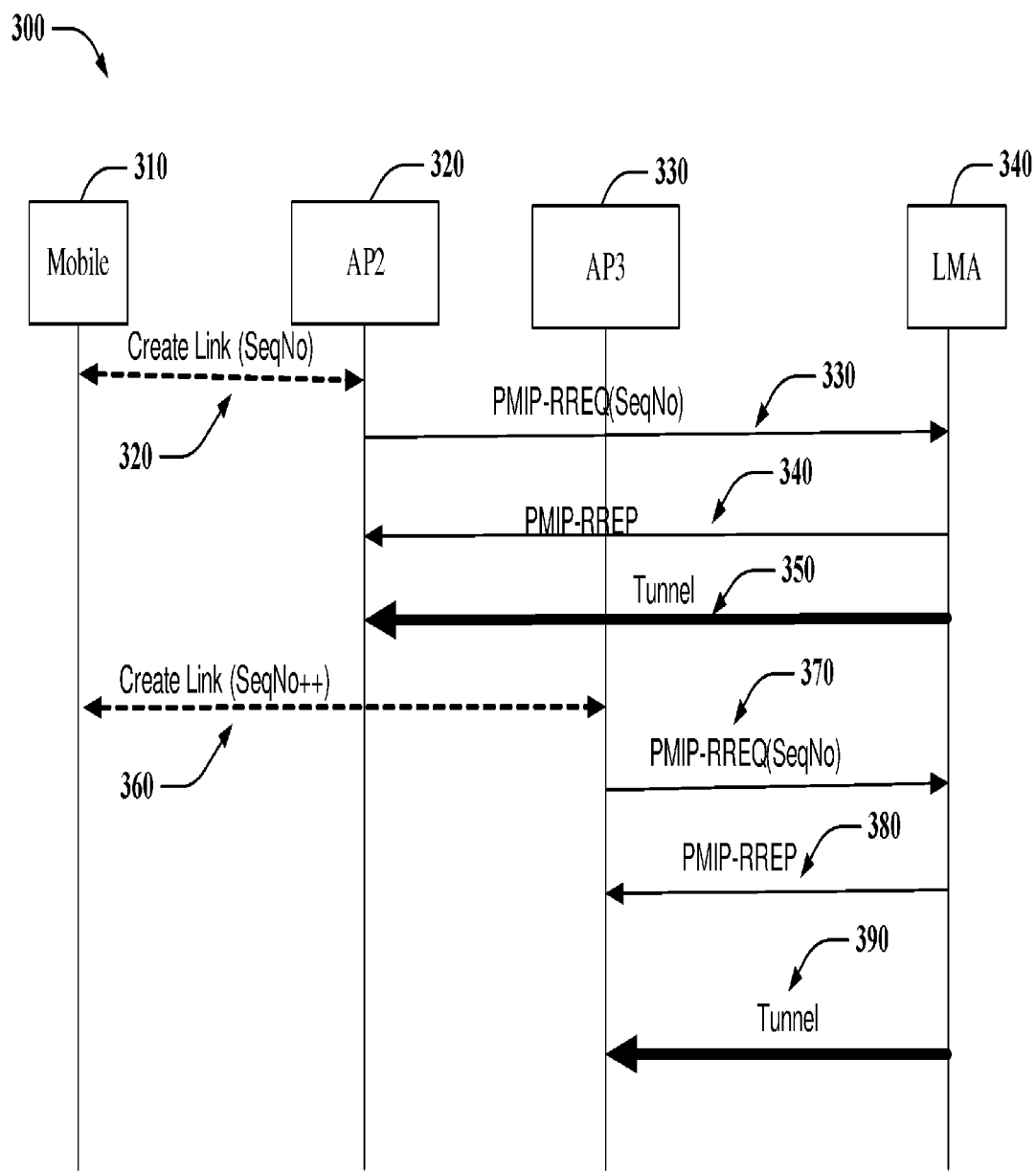
FIG. 3 is a message flow diagram that illustrates example messages and registrations depicted in FIG. 2.

Now referring to FIG. 3, a message flow diagram 300 illustrates the example messages and registrations depicted in FIG. 2. As shown, the diagram includes a mobile 310, an access point 2 (AP2) 312, an access point 3 (AP3) 314, and an LMA 316. At 320, a link creation message having sequence data is sent between the mobile 310 and AP2 312. At 330, AP2 312 generates a request 330 to the LMA 216. At 340, the LMA 316 generates a request response to AP2

312 and forms a tunnel channel at 350 with AP2. When a subsequent access point is required by the mobile 310, a subsequent creation link is formed at 360 between the mobile 310 and AP3 314 with a different sequence number. Proceeding to 370, a subsequent request employing the subsequent sequence number is generated to the LMA 316 from AP3 314. At 380, the LMA 316 generates a request response in view of the subsequent request, and at 390 a new tunnel channel is formed between AP3 214 and the LMA.

Figure 4:
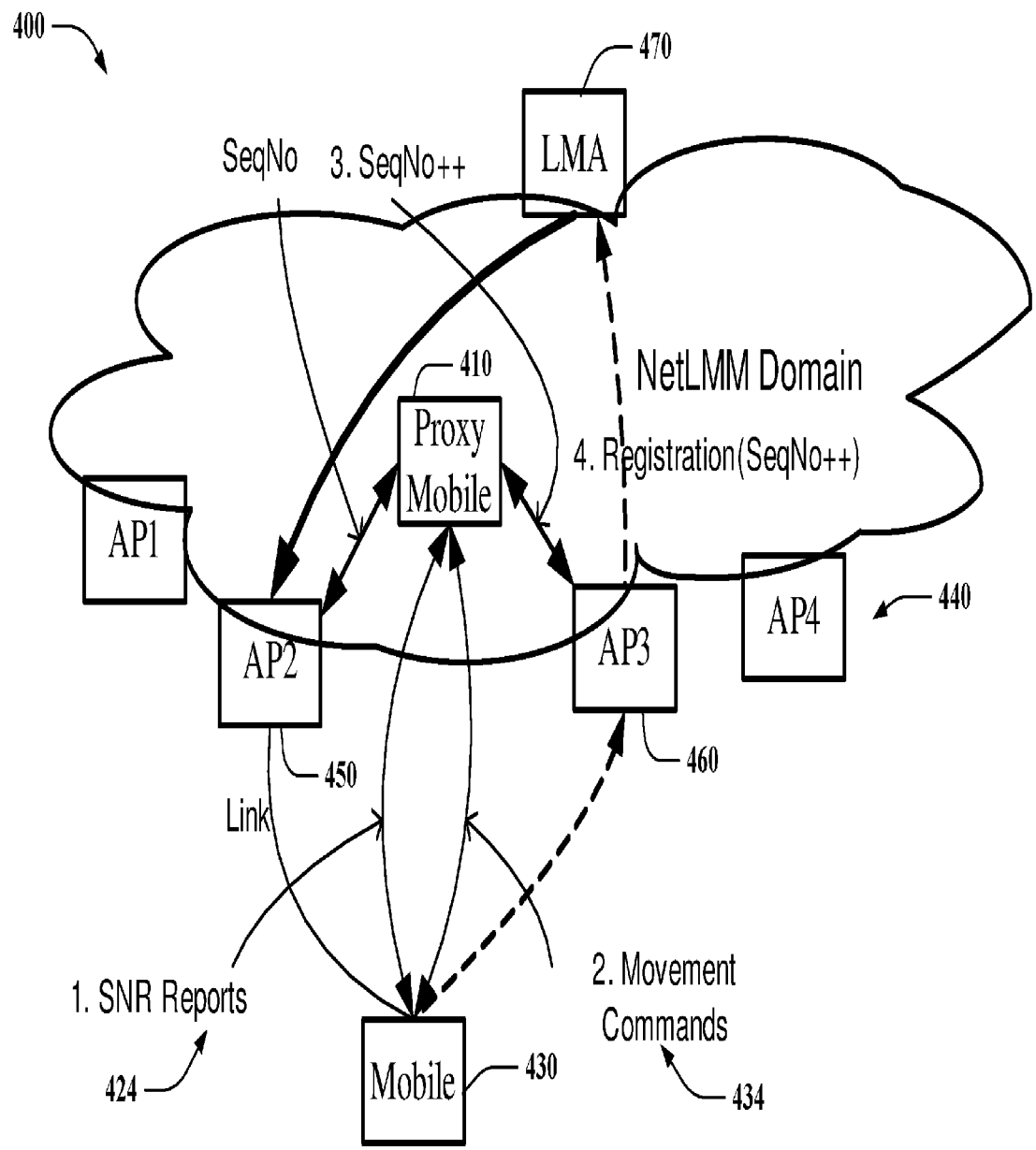
FIG. 4 illustrates an example proxy-based system.

Turning to FIG. 4, an example proxy-based system 400 is illustrated. The system 400 shows how sequence data can be employed to order registration messages by using a Proxy Mobile 410 in a network 420. The system 400 can be used in Network Controlled handoffs where a network controller (not shown) (collocated or in communication with a Proxy Mobile) receives signal to noise ratio (SNR) (or other link quality parameter) reports at 424 from a mobile 430 for the different access points 440 the mobile is in the region of. Based on such signal quality measurements, the Network Controller commands the mobile 430 to move at 434, say from AP2 at 450 to AP3 at 460 in this example. Thus, the Proxy Mobile 410 then sends a Sequence Number to AP3 460 which is incremented from the last Sequence Number used when the link with AP2 at 450 was established. The AP3 460 then includes the Sequence Number in the Registration message sent to the LMA at 470.

Figure 5:
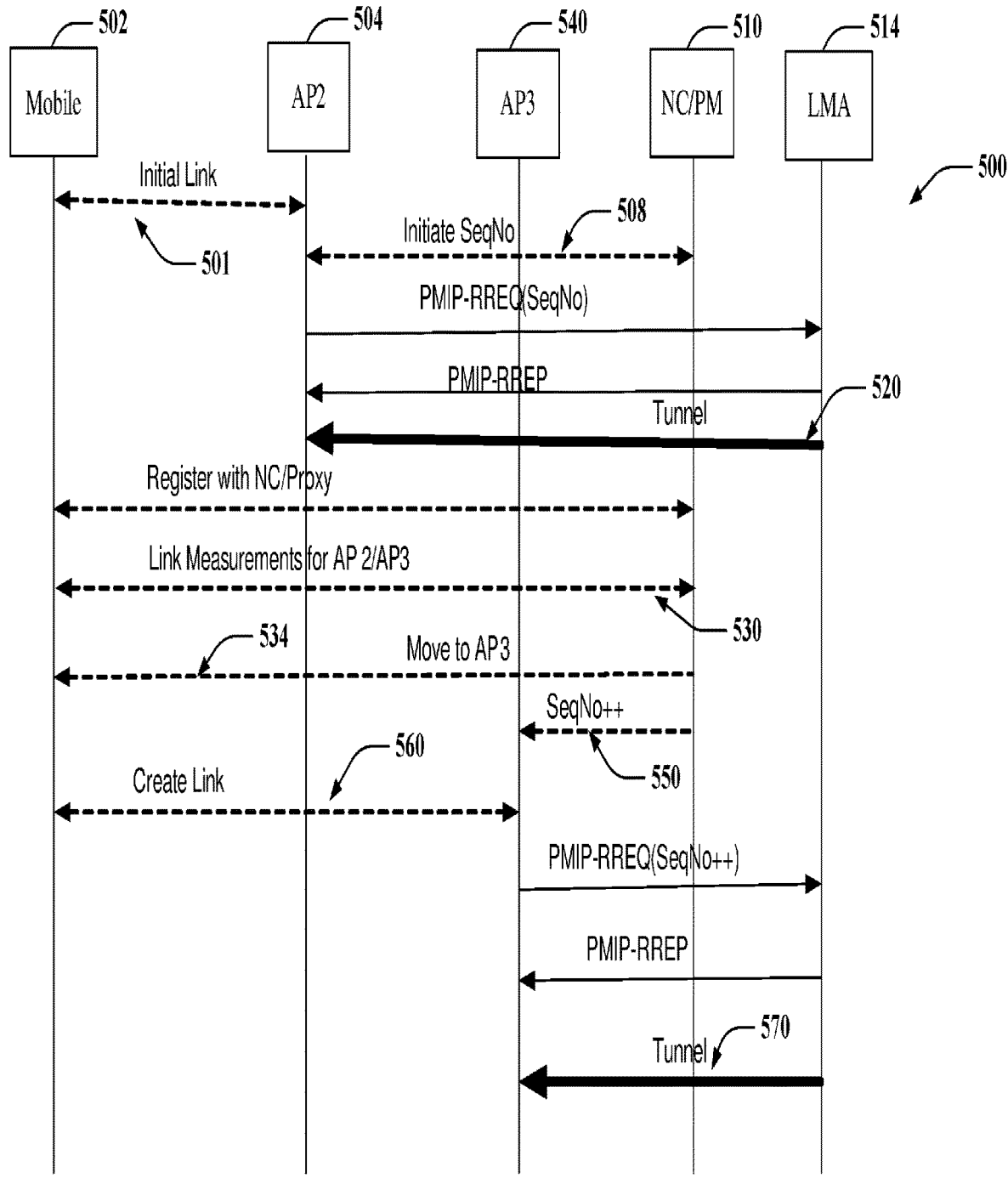
FIG. 5 is a message flow diagram that illustrates example messages and registrations depicted in FIG. 4.

Referring to FIG. 5, a message flow diagram 500 illustrates example messages and registrations depicted in FIG. 4. In the diagram 500, dashed lines represent optional messages that can be provided in various ways. A mobile 502 creates an initial link 501 with AP2 504. Then, AP2 504 initiates a Sequence Number 508 with a Network Controller (NC)/Proxy Mobile (PM) 510. It is noted that the NC and PM at 510 may be collocated or may be independent but communicating processes. In one aspect, AP2 504 uses the Sequence Number 508 provided by NC/PM 510 to perform a PMIP registration with an LMA 514. The LMA 514 forms a tunnel now at 520 for the mobile points to AP2 504.

The Mobile 502 sends link measurement reports at 530 (e.g., SNR reports) to the NC/PM 510. The NC/PM 510 makes a decision that AP3 at 540 is a more suitable access point for the Mobile 502 and sends a command at 534 to the mobile 502 to instruct it to move to AP3 540. The NC/PM 510 also sends a new Sequence Number 550 to AP3 540. The mobile 502 creates a link 560 to AP3 540 and the AP3 performs a PMIP registration—this time with the new Sequence Number. A tunnel 570 now points to AP3 540 for that mobile 502. The Sequence Number can be a number or a timestamp or other incrementing ID as noted previously. A PMIP protocol is utilized as an example implementation of NetLMM, where NetLMM may be implemented with other message types between an access router (also called a MAG) and the LMA 514. Another variant of this message exchange is that instead of PMIP, regular MIP can be used with the NC/PM node 510 providing a Mobile IP client and the LMA providing a Mobile IP Home Agent. The APs may optionally be Mobile IP Foreign agents, if desired.

Figure 6:
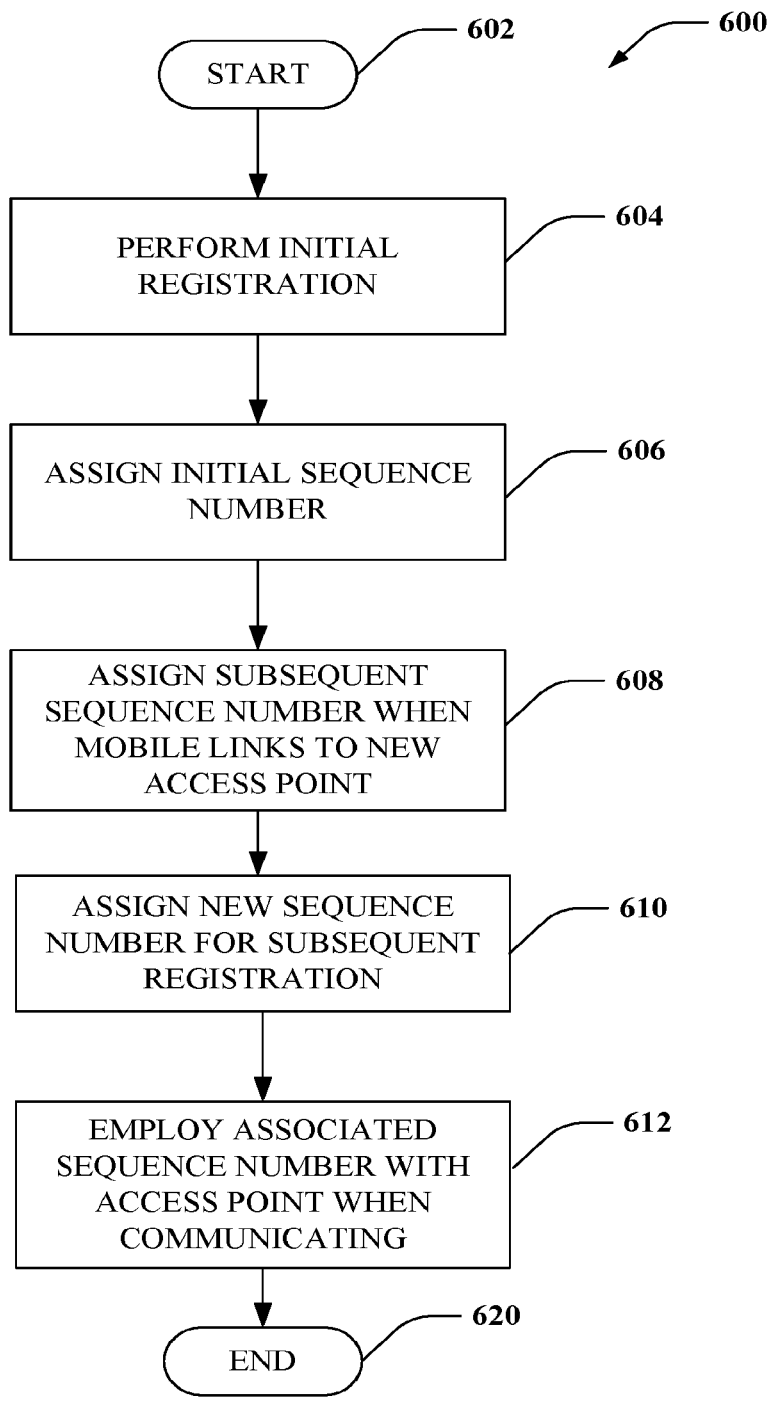
FIG. 6 illustrates an example sequence process for ordering messages.

Referring to FIG. 6, a methodology 600 relating to message ordering and registration is illustrated. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 602, the process 600 begins where an initial registration is performed at 604 when a mobile device communicates via an access node to a domain node such as a local mobility anchor (LMA). At 606, in accordance with the registration, a sequence number is generated by the device that will be employed for communications with during communications with the respective access node registered at 604. At 608, when the mobile device moves out of range of the previous access point and into range of another access point, a subsequent registration is performed with the LMA through the new access point. At 610, a new sequence number is assigned for the subsequent registration at 608 by the mobile device. As noted above, the sequence numbers can take the form of incremental data, decremented data, or time stamp data for example. Also, if yet another access point is encountered, yet another registration can be performed along with generation of yet another sequence number.

At 612, the mobile device employs the respective sequence number when communicating with a given access point. For instance, if sequence number 1 is generated when registering to access point 1, then sequence number 1 is employed as part of the messaging protocol for future communications through access point 1. Similarly, if sequence number 2 is generated when registering through access point 2, then sequence number 2 is employed by the mobile device as part of its messaging protocol for further communications through access point 2. In this manner, message ordering can be achieved and effects such as node ping-pong are mitigated. As can be appreciated, more than two nodes can be registered having additional sequence numbers as may be necessary for the additional access points.

Figure 7:
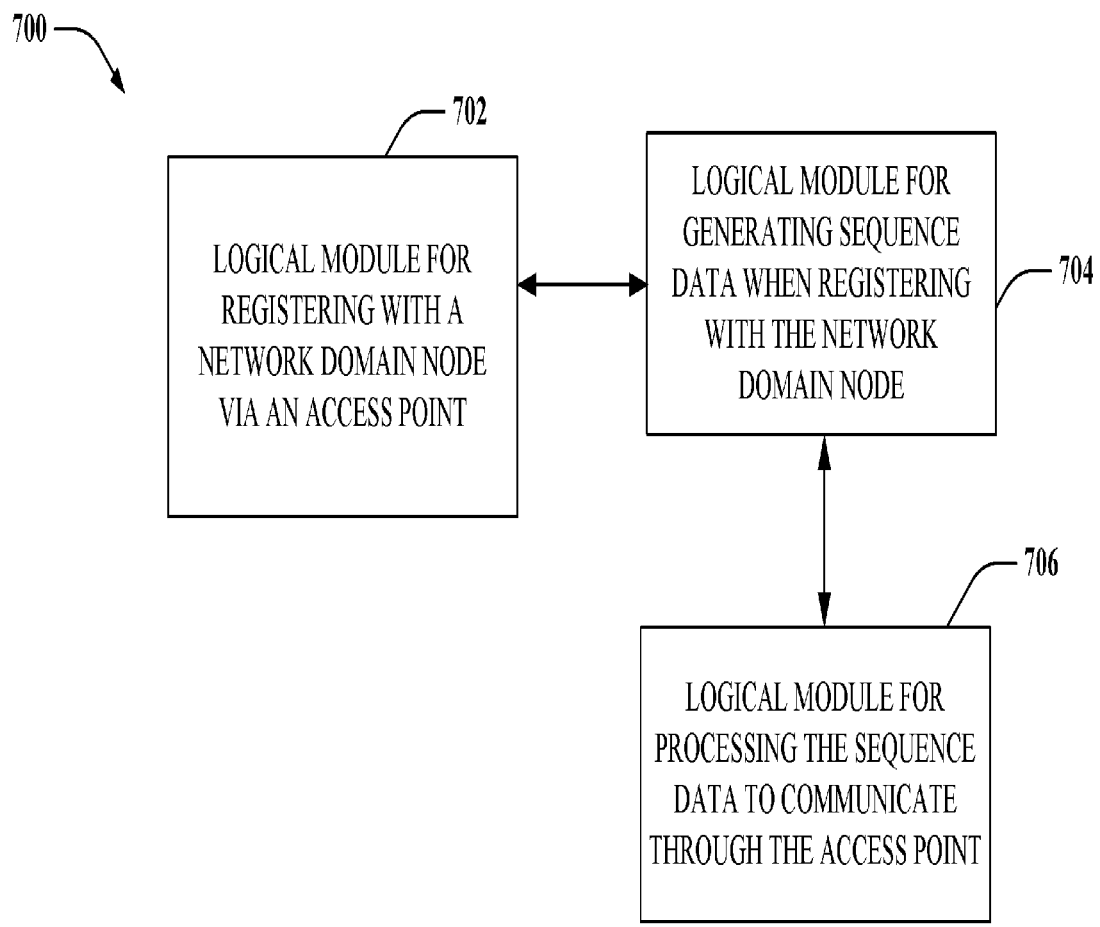
FIGS. 7 and 8 illustrate example logical modules for processing sequence messages and registrations.
Figure 8:
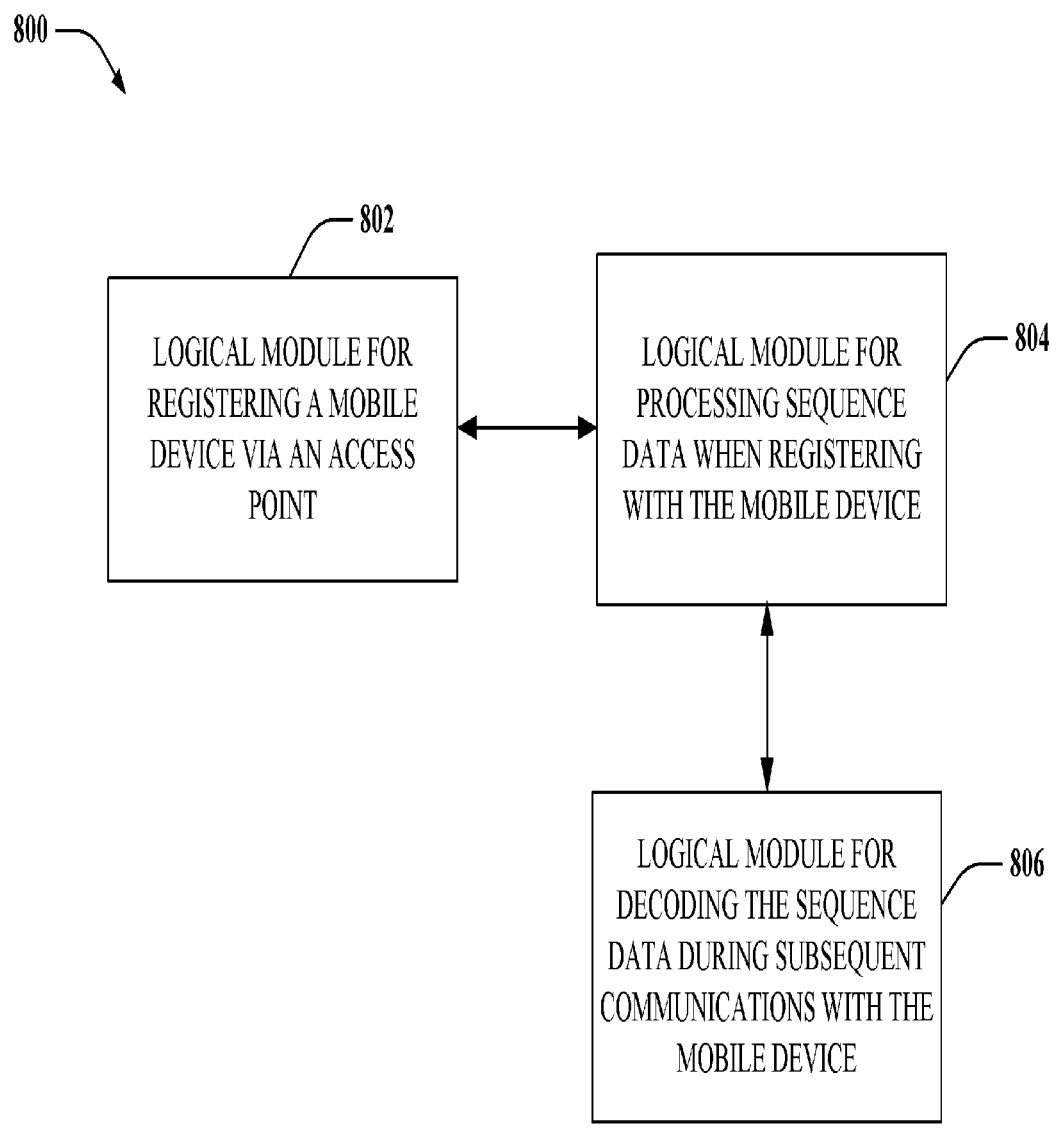

Turning now to FIGS. 7 and 8 collectively, systems are provided that relate to sequence ordering with respect to a terminal, operator networks, access nodes, and traffic flows therewith. The systems are represented as a series of interrelated functional blocks, which can represent functions implemented by a processor, software, hardware, firmware, or any suitable combination thereof.

Referring specifically to FIG. 7, a system 700 that facilitates communications from a mobile device. The system 700 includes a logical module 702 for registering with a network domain node via an access point and a logical module 704 for generating sequence data when registering with the network domain node. A logical module 706 can be employed for processing the sequence data to communicate through the access point.

Now referring to FIG. 8, a system 800 that facilitates communications from a network domain node. The system 800 includes a logical module 802 for registering a mobile device via an access point and a logical module 804 for processing sequence data when registering with the mobile device. A logical module 806 can be utilized for decoding the sequence data during subsequent communications with the mobile device.

Figure 9:
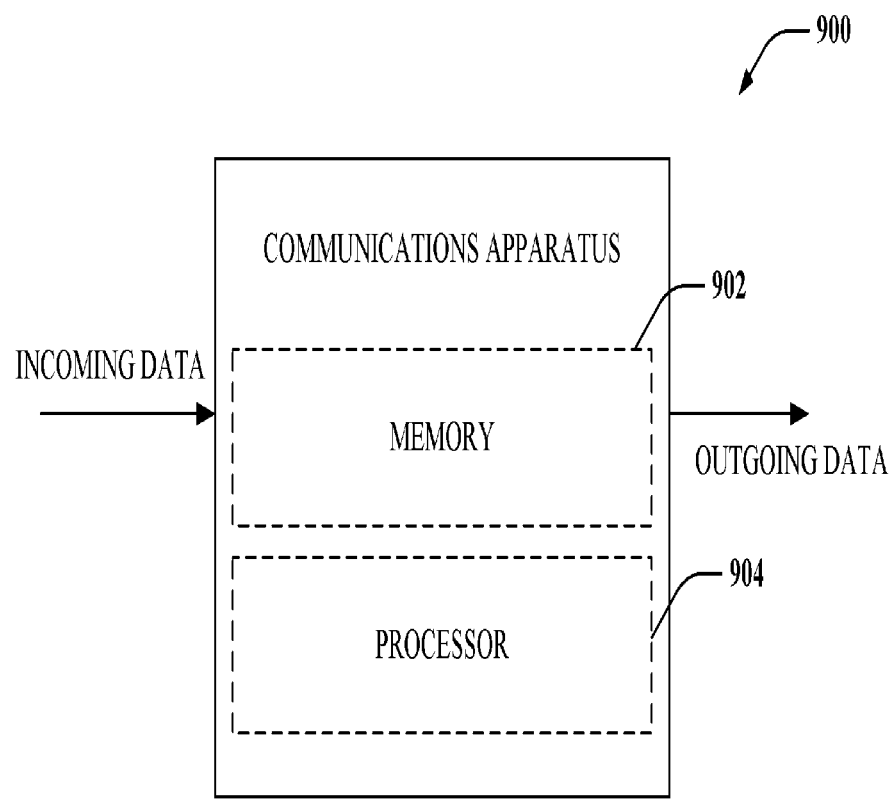
FIG. 9 illustrates an example communications apparatus that employs sequential data to form communications links.
Figure 10:
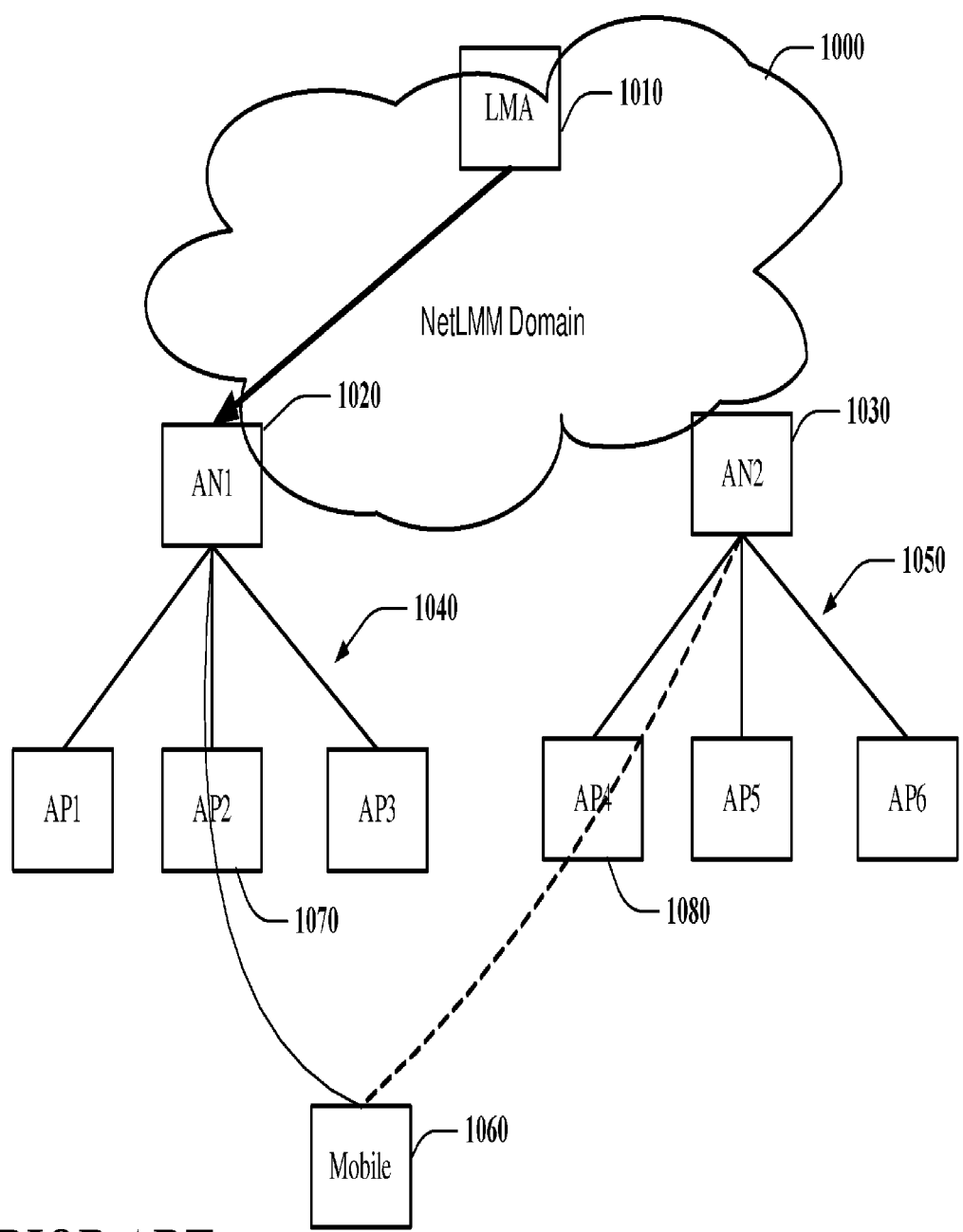
FIG. 10 illustrates a prior art network based mobility management system.

FIG. 9 illustrates a communications apparatus 900 that can be a wireless communications apparatus, for instance, such as a wireless terminal. Additionally or alternatively, communications apparatus 900 can be resident within a wired network. Communications apparatus 900 can include memory 902 that can retain instructions for configuring such apparatus with respect to quality of service (QoS) data and sequence data for a terminal (and traffic flows associated therewith). Additionally, communications apparatus 900 may include a processor 904 that can execute instructions within memory 902 and/or instructions received from another network device, wherein the instructions can relate to configuring or operating the communications apparatus 900 or a related communications apparatus.

Figure 11:
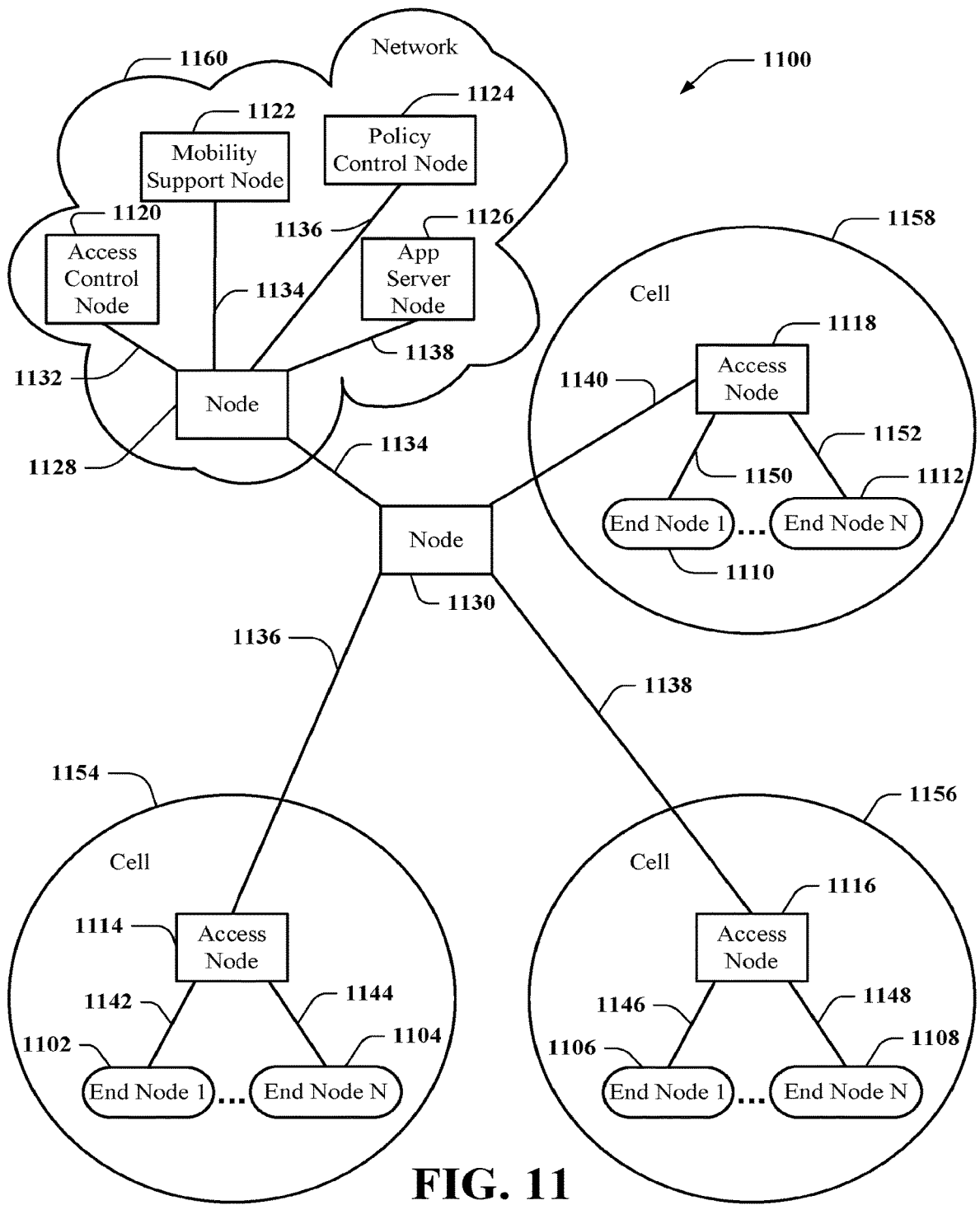
FIG. 11 illustrates an example communications system.

To provide additional context for one or more embodiments described herein, FIG. 11 is provided to illustrate an example communication system 1100 that comprises a plurality of nodes interconnected by communications links. The system 1100 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 1100 exchange information using signals, e.g., messages, based on communication protocols, e.g., the Internet Protocol (IP). The communications links of the system 1100 may be implemented, for example, using wires, fiber optic cables, and/or wireless communications techniques. The system 1100 includes a plurality of end nodes 1102-1112, which access the communication system 1100 by way of a plurality of access nodes 1114-1118. End nodes 1102-1112 may be, e.g., wireless communication devices or terminals, and the access nodes 1114-1118 may be, e.g., wireless access routers or base stations. Communication system 1100 also includes a number of other nodes 1120-1130 that are used to provide interconnectivity or to provide specific services or functions.

Communications system 1100 depicts a network 1160 that includes access control node 1120, mobility support node 1122, policy control node 1124, and application server node 1126, all of which are connected to an intermediate network node 1128 by a corresponding network link 1132-1138, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 1122, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 1124, e.g., a policy server or Policy Decision Point (PDP), supports policy authorization for services or application layer sessions. In some embodiments, application server node 1126, e.g., a Session Initiation Protocol server, streaming media server, or other application layer server, supports session signaling for services available to end nodes and/or provides services or content available to end nodes.

Intermediate network node 1128 in network 1160 provides interconnectivity to network nodes that are external from the perspective of network 1160 by way of network link 1134. Network link 1134 is connected to intermediate network node 1130, which provides further connectivity to access nodes 1114, 1116, and 1118 by way of network links 1136-1140, respectively. Each access node 1114-1118 is depicted as providing connectivity to end nodes 1102-1112, respectively, by way of corresponding access links 1142-1152, respectively. In communication system 1100, each access node 1114-1118 is depicted as using wireless technology, e.g., wireless access links, to provide access. Wired technology may also be utilized, however, in connection with provision of access. A radio coverage area, e.g., communications cells 1154-1158 of each access node 1114-1118, is illustrated as a circle surrounding the corresponding access node.

Communication system 1100 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 1100. Additionally, some of the functional entities depicted in communication system 1100 may be omitted or combined. Location or placement of these functional entities may also be varied.

Figure 12:
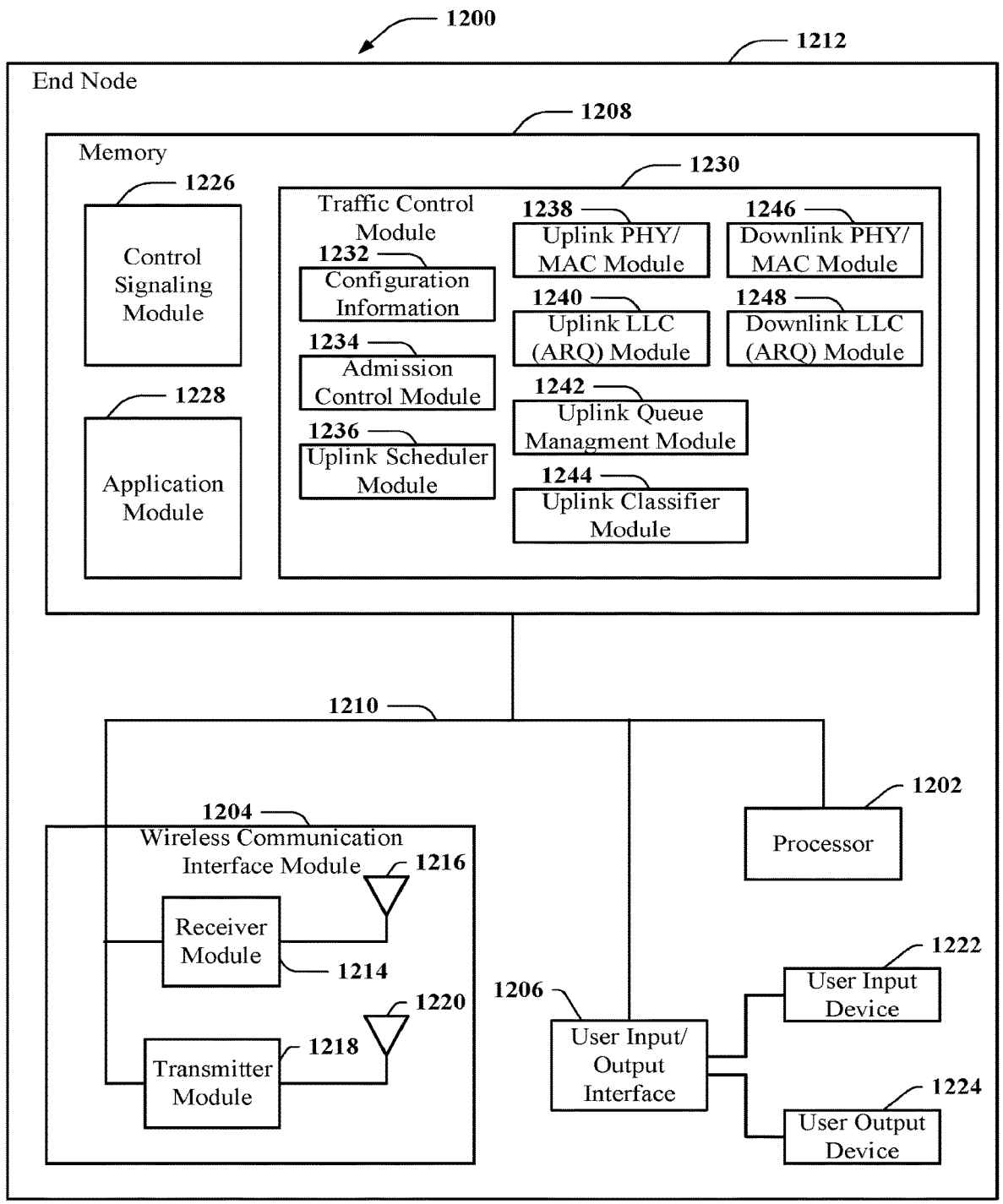
FIG. 12 illustrates an example end node.

FIG. 12 provides an illustration of an example end node 1200, e.g., wireless terminal. End node 1200 is a representation of an apparatus that may be used as any one of end nodes 1102-1112 (FIG. 11). End node 1200 includes a processor 1202, a wireless communication interface module 1204, a user input/output interface 1206 and memory 1208 coupled together by a bus 1210. Accordingly, by way of bus 1210, the various components of the end node 1200 can exchange information, signals and data. Components 1202-1208 of end node 1200 can be located inside a housing 1212.

Wireless communication interface module 1204 provides a mechanism by which the internal components of end node 1200 can send and receive signals to/from external devices and network nodes, e.g., access nodes. Wireless communication interface module 1204 includes, e.g., a receiver module 1214 with a corresponding receiving antenna 1216 and a transmitter module 1218 with a corresponding transmitting antenna 1220 used for coupling end node 1200 to other network nodes, e.g., by way of wireless communications channels.

End node 1200 also includes a user input device 1222, e.g., keypad, and a user output device 1224, e.g., display, which are coupled to bus 1210 through user input/output interface 1206. Thus, user input/output devices 1222 and 1224 can exchange information, signals and data with other components of end node 1200 by way of user input/output interface 1206 and bus 1210. User input/output interface 1206 and associated devices 1222 and 1224 provide mechanisms by which a user can operate end node 1200 to accomplish various tasks. In particular, user input device 1222 and user output device 1224 provide functionality that allows a user to control end node 1200 and applications, e.g., modules, programs, routines and/or functions, that execute in memory 1208 of end node 1200.

Processor 1202, under control of various modules, e.g., routines, included in memory 1208 controls operation of end node 1200 to perform various signaling and processing. The modules included in memory 1208 are executed on startup or as called by other modules. Modules may exchange data, information, and signals when executed. Modules may also share data and information when executed. Memory 1208 of end node 1200 includes a control signaling module 1226, an application module 1228, and a traffic control module 1230, which further includes configuration information 1232 and various additional modules.

Control signaling module 1226 controls processing relating to receiving and sending signals, e.g., messages, for controlling operation and/or configuration of various aspects of end node 1200 including, e.g., traffic control module 1230 as well as configuration information 1232 and various additional modules included. In some embodiments, control signaling module 1226 can include state information, e.g., parameters, status and/or other information, relating to operation of end node 1200 and/or one or more signaling protocols supported by control signaling module 1226. In particular, control signaling module 1226 may include configuration information, e.g., end node identification information and/or parameter settings, and operational information, e.g., information about current processing state, status of pending message transactions, etc.

Application module 1228 controls processing and communications relating to one or more applications supported by end node 1200. In some embodiments, application module 1228 processing can include tasks relating to input/output of information by way of the user input/output interface 1206, manipulation of information associated with an application, and/or receiving or sending signals, e.g., messages, associated with an application. In some embodiments, application module 1228 includes state information, e.g., parameters, status and/or other information, relating to operation of one or more applications supported by application module 1228. In particular, application module 1228 may include configuration information, e.g., user identification information and/or parameter settings, and operational information, e.g., information about current processing state, status of pending responses, etc. Applications supported by application module 1228 include, e.g., Voice over IP (VoIP), web browsing, streaming audio/video, instant messaging, file sharing, gaming, etc.

Traffic control module 1230 controls processing relating to receiving and sending data information, e.g., messages, packets, and/or frames, through wireless communication interface module 1204. The example traffic control module 1230 includes configuration information 1232 as well as various additional modules that control various aspects of QoS for packets and/or traffic flows, e.g., associated sequences of packets. Various additional modules are included, in some embodiments, to perform particular functions and operations as needed to support specific aspects of traffic control. Modules may be omitted and/or combined as needed depending on the functional requirements of traffic control. A description of each additional module included in traffic control module 1230 follows.

An admission control module 1234 maintains information relating to resource utilization/availability and determines if sufficient resources are available to support QoS parameters desirably associated with particular traffic flows. Resource availability information maintained by admission control module 1234 includes, e.g., packet and/or frame queuing capacity, scheduling capacity, as well as processing and memory capacity needed to support one or more traffic flows. Control signaling module 1226, application module 1228, and/or other modules included in end node 1200 may query admission control module 1234 to determine if sufficient resources are available to support a new or modified traffic flow, where the admission control determination is a function of QoS parameters of the particular traffic flow and QoS parameters defined within a profile. Configuration information 1232 can include configuration information, e.g., parameters settings, that affect the operation of admission control module 1234, e.g., an admission control threshold value that indicates percentage of resource that may be allocated prior to rejecting additional requests.

An uplink scheduler module 1236 controls processing relating to transmission scheduling, e.g., order and/or timing, and allocation of transmission resources, e.g., information coding rate, transmission time slots, and/or transmission power, for data information, e.g., messages, packets, and/or frames, to be sent by way of wireless communication interface module 1204, e.g., from end node 1200 to an access node. Uplink scheduler module 1236 can schedule transmissions and allocate transmission resources as a function of QoS parameters associated with one or more traffic flows. In some embodiments, scheduling and/or resource allocation operations performed by uplink scheduler module 1236 are additionally a function of channel conditions and other factors, e.g., power budget.

An uplink PHY/MAC module 1238 controls physical (PHY) layer and Media Access Control (MAC) layer processing relating to sending data information, e.g., messages, packets, and/or frames, by way of wireless communication interface module 1204, e.g., from end node 1200 to an access node. For instance, operation of uplink PHY/MAC module 1238 includes both sending and receiving control information, e.g., signals or messages, to coordinate sending of data information, e.g., messages, packets, and/or frames. Configuration information 1232 can include configuration information, e.g., parameters settings, that affect the operation of uplink PHY/MAC module 1238, e.g., a frequency, band, channel, spreading code or hoping code to be used for transmissions, an identifier associated with end node 1200, a request dictionary prescribing use of an assignment request channel, etc.

An uplink LLC (ARQ) module 1240 controls Logical Link Control (LLC) layer processing relating to sending data information, e.g., messages, packets, and/or frames, through wireless communication interface module 1204, e.g., from end node 1200 to an access node. Uplink LLC (ARQ) module 1240 includes processing associated with Automatic Repeat Request (ARQ) capabilities, e.g., retransmission of lost packets or frames. Uplink LLC (ARQ) module 1240 can, for instance, further include processing relating to addition of an LLC header and/or trailer to higher layer messages, e.g., packets, to provide additional functionality, e.g., multi-protocol multiplexing/demultiplexing by way of a type field or error detection through utilization of a checksum field. Uplink LLC (ARQ) module 1240 can additionally perform fragmentation of higher layer messages, e.g., packets, into multiple sub-portions, e.g., frames to be sent by uplink PHY/MAC module 1240. Configuration information 1232 can include configuration information that affect operation of uplink LLC (ARQ) module 1240, e.g., an ARQ window size, maximum number of retransmissions, a discard timer, etc.

An uplink queue management module 1242 maintains information and controls processing relating to storage of data information to be sent by way of wireless communication interface module 1204, e.g., from end node 1200 to an access node. Uplink queue management module 1242 can, for example, control storage of data information awaiting transmission and maintain state information regarding data information awaiting transmission on a per traffic flow basis, e.g., packets associated with each traffic flow may be stored in separate queues. For instance, uplink queue management module 1242 supports a variety of queue management techniques and/or capabilities, e.g., head drop, tail drop, as well as various Active Queue Management (AQM) mechanisms such as Random Early Detection (RED). Configuration information 1232 can include configuration information that affects operation of uplink queue management module 1242, such as a queue limit, drop strategy, and/or AQM thresholds associated with one or more traffic flows.

An uplink classifier module 1244 controls processing relating to identification of data information as belonging to particular traffic flows prior to being sent by way of the wireless communication interface module 1204, e.g., from end node 1200 to an access node. In some embodiments, messages, packets, and/or frames to be sent through utilization of wireless communication interface module 1204 are classified as belonging to one of a variety of traffic flows by uplink classifier module 1244 based on inspection of one or more header and/or payload fields. Results of classification by uplink classifier module 1244 can affect the treatment of classified data information by uplink queue management module 1242 as well as other modules within memory 1208. For example, the results may determine a particular queue the message, packet, and/or frame will be associated with for storage and further affect subsequent processing such as scheduling. Configuration information can include configuration information that affect operation of uplink classifier module 1244, e.g., a set of one or more classifier filter rules that prescribe criteria used to associate data information, e.g., messages, packets, and/or frames, as belonging to one or more traffic flows.

A downlink PHY/MAC module 1246 controls PHY layer and MAC layer processing relating to receiving data information by way of wireless communication interface module 1204. Operation of downlink PHY/MAC module 1246 can include both sending and receiving control information to coordinate receiving of data information. Configuration information 1204 can include configuration information that affect operation of downlink PHY/MAC module 1246, e.g., a frequency, band, channel, spreading code or hoping code to be used for reception, an identifier associated with end node 1200, etc.

A downlink LLC (ARQ) module 1248 controls LLC layer processing relating to receiving data information by way of wireless communication interface module 1204. Downlink LLC (ARQ) module 1248 includes processing associated with ARQ capabilities, e.g., retransmission of lost packets or frames. For example, downlink LLC (ARQ) module 1248 can further include processing relating to an LLC header and/or trailer that encapsulates higher layer messages, which provides additional functionality, e.g., multi-protocol multiplexing/demultiplexing through a type field or error detection by way of a checksum field. Downlink LLC (ARQ) module 1248 can also perform reassembly of frames received by the downlink PHY/MAC module 1246 into higher layer messages. Configuration information 1232 can, and in some embodiments does, include configuration information, e.g., parameters settings, that affect operation of downlink LLC (ARQ) module 1248, e.g., an ARQ window size, maximum number of retransmissions, a discard timer, etc.

Figure 13:
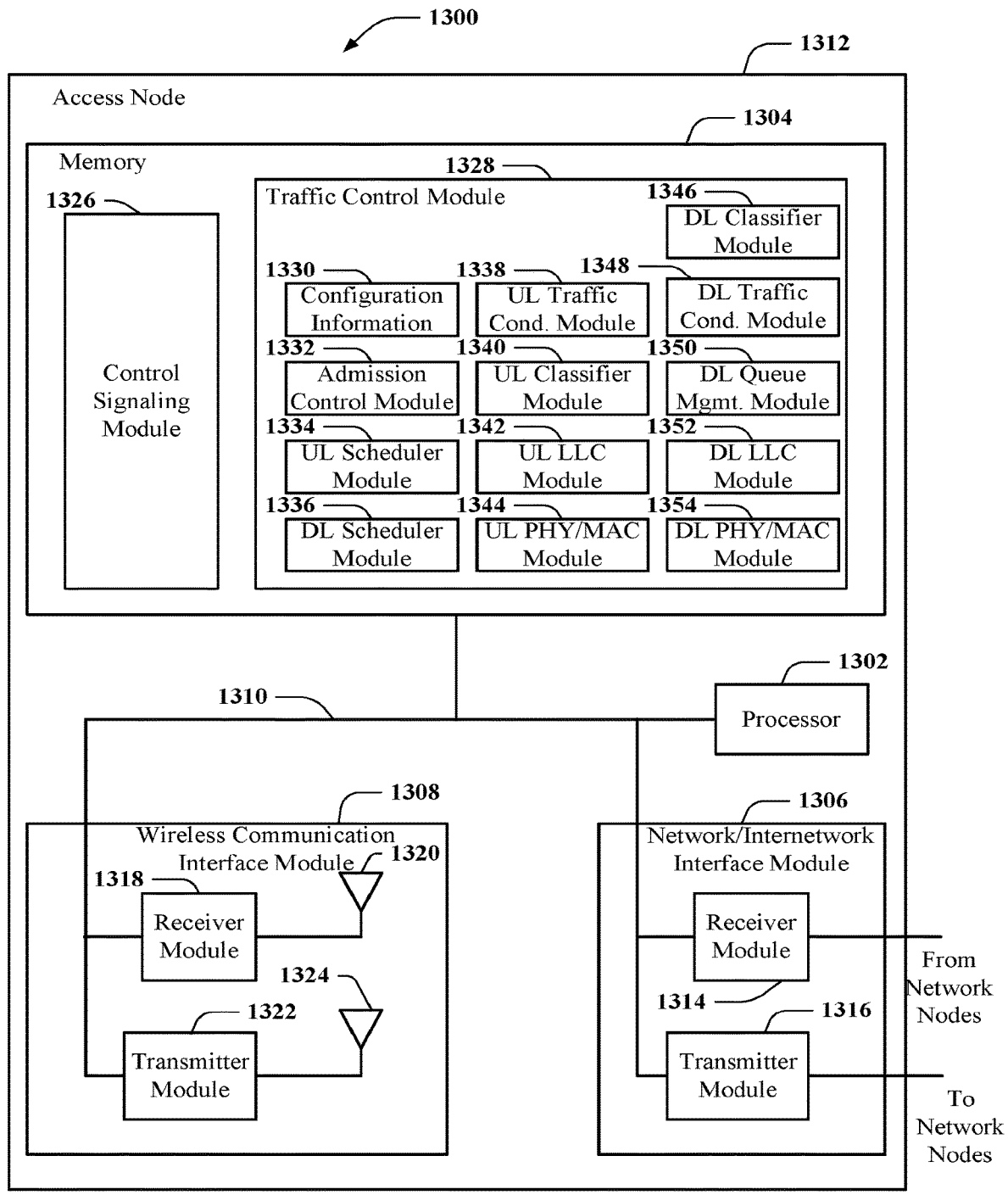
FIG. 13 illustrates an example access node.

FIG. 13 provides a detailed illustration of an example access node 1300 implemented in accordance with the present invention. The access node 1300 is a detailed representation of an apparatus that may be used as any one of the access nodes 1114-1118 depicted in FIG. 11. In the FIG. 13 embodiment, access node 1300 includes a processor 1302, memory 1304, a network/internetwork interface module 1306 and a wireless communication interface module 1308, coupled together by bus 1310. Accordingly, by way of bus 1310 the various components of access node 1300 can exchange information, signals and data. The components 1302-1310 of access node 1300 are located inside a housing 1312.

Network/internetwork interface module 1306 provides a mechanism by which the internal components of access node 1300 can send and receive signals to/from external devices and network nodes. Network/internetwork interface module 1306 includes a receiver module 1314 and a transmitter module 1316 used for coupling node 1300 to other network nodes, e.g., through copper wires or fiber optic lines. Wireless communication interface module 1308 also provides a mechanism by which the internal components of access node 1300 can send and receive signals to/from external devices and network nodes, e.g., end nodes. Wireless communication interface module 1308 includes, e.g., a receiver module 1318 with a corresponding receiving antenna 1320 and a transmitter module 1322 with a corresponding transmitting antenna 1324. Wireless communication interface module 1308 is used for coupling access node 1300 to other nodes, e.g., by way of wireless communication channels.

Processor 1302 under control of various modules, e.g., routines, included in memory 1304 controls operation of access node 1300 to perform various signaling and processing. The modules included in memory 1304 are executed on startup or as called by other modules. Modules may exchange data, information, and signals when executed. Modules may also share data and information when executed. In the FIG. 13 embodiment, memory 1304 of access node 1300 includes a control signaling module 1326 and a traffic control module 1328, which further includes configuration information 1330 and various additional modules 1332-1354.

Control signaling module 1326 controls processing relating to receiving and sending signals, e.g., messages, for controlling operation and/or configuration of various aspects of access node 1300 including, e.g., traffic control module 1328 as well as configuration information 1330 and the various additional modules included therein 1332-1354. For instance, control signaling module 1326 includes state information, e.g., parameters, status and/or other information, relating to operation of access node 1300 and/or one or more signaling protocols supported by control signaling module 1326. In particular, control signaling module 1326 may include configuration information, e.g., access node identification information and/or parameter settings, and operational information, e.g., information about current processing state, status of pending message transactions, etc.

Traffic control module 1328 controls processing relating to receiving and sending data information, e.g., messages, packets, and/or frames, by way of wireless communication interface module 1308. For instance, traffic control module can include configuration information 1330 as well as various additional modules 1332-1354 that control various aspects of quality of service for packets and/or traffic flows, e.g., associated sequences of packets. In some embodiments, traffic control module 1328 includes state information, e.g., parameters, status and/or other information, relating to operation of access node 1300, traffic control module 1328, and/or one or more of the various additional modules included therein 1332-1354. Configuration information 1330, e.g., parameter settings, determines, affects and/or prescribes operation of traffic control module 1328 and/or the various additional modules included therein 1332-1354. The various additional modules are included, in some embodiments, to perform particular functions and operations as needed to support specific aspects of traffic control. In various embodiments, modules may be omitted and/or combined as needed depending on the functional requirements of traffic control. A description of each additional module included in traffic control module 1328 follows.

Admission control module 1332 maintains information relating to resource utilization/availability and determines if sufficient resources are available to support quality of service requirements of particular traffic flows. Resource availability information maintained by admission control module 1332 includes, e.g., packet and/or frame queuing capacity, scheduling capacity, as well as processing and memory capacity needed to support one or more traffic flows. Control signaling module 1326 and/or other modules included in access node 1300 can query admission control module 1332 to determine if sufficient resources are available to support a new or modified traffic flow, where the admission control determination is a function of the quality of service requirements of the particular traffic flow and/or the available resources. Configuration information 1330 can include configuration information, e.g., parameters settings, that affect the operation of admission control module 1332, e.g., an admission control threshold value that indicates the percentage of resource that may be allocated prior to rejecting additional requests.

Uplink scheduler module 1334 controls processing relating to transmission scheduling, e.g., order and/or timing, and allocation of transmission resources, e.g., information coding rate, transmission time slots, and/or transmission power, for data information, e.g., messages, packets, and/or frames, to be sent from one or more end nodes to the access node by way of wireless interface module 1308. Uplink scheduler module 1334 can schedule transmissions and allocate transmission resources as a function of the quality of service requirements and/or constraints associated with one or more traffic flows and/or one or more end nodes. Configuration information 1330 can include configuration information that affect the operation of uplink scheduler module 1334, e.g., a priority, rate bound, latency bound, and/or sharing weight associated with one or more traffic flows and/or end nodes. In some embodiments, scheduling and/or resource allocation operations performed by uplink scheduler module 1334 are additionally a function of channel conditions and other factors, e.g., power budget.

Downlink scheduler module 1336 controls processing relating to transmission scheduling, e.g., order and/or timing, and allocation of transmission resources, e.g., information coding rate, transmission time slots, and/or transmission power, for data information, e.g., messages, packets, and/or frames, to be sent from access node 1300 to one or more end nodes through wireless interface module 1308. Downlink scheduler module 1336 can schedule transmissions and allocate transmission resources as a function of the quality of service requirements and/or constraints associated with one or more traffic flows and/or one or more end nodes. Configuration information 1330 can include configuration information that affects the operation of downlink scheduler module 1336, e.g., a priority, rate bound, latency bound, and/or sharing weight associated with one or more traffic flows and/or end nodes. In some embodiments, scheduling and/or resource allocation operations performed by the downlink scheduler module 1336 are additionally a function of channel conditions and other factors, e.g., power budget.

Uplink traffic conditioner module 1338 controls processing relating to traffic conditioning, e.g., metering, marking, policing, etc., for data information, e.g., messages, packets, and/or frames, received by way of wireless interface module 1308, e.g., from an end node to access node 1300. Uplink traffic conditioner module 1338 can condition traffic, e.g., meter, mark and/or police, as a function of the quality of service requirements and/or constraints associated with one or more traffic flows and/or one or more end nodes. Configuration information 1330 can include configuration information that affects the operation of uplink traffic conditioner module 1338, e.g., a rate bound, and/or marking value associated with one or more traffic flows and/or end nodes.

Uplink classifier module 1340 controls processing relating to identification of data information, e.g., messages, packets, and/or frames, received through wireless interface module 1308, e.g., from an end node to access node 1300, as belonging to particular traffic flows prior to being processed by uplink traffic conditioner module 1338. In some embodiments, messages, packets, and/or frames received through wireless communication interface module 1308 are classified as belonging to one of a variety of traffic flows by uplink classifier module 1340 based on inspection of one or more header and/or payload fields. The results of classification by uplink classifier module 1340 can affect the treatment of the classified data information, e.g., messages, packets, and/or frames, by uplink traffic conditioner module 1338, e.g., the results may determine a particular data structure or state machine the message, packet, and/or frame will be associated with and further affect subsequent processing such as metering, marking, and/or policing. Configuration information 1330 can include configuration information that affects the operation of uplink classifier module 1340, e.g., a set of one or more classifier filter rules that prescribe criteria used to associate data information, e.g., messages, packets, and/or frames, as belonging to one or more traffic flows.

Uplink LLC (ARQ) module 1342 controls LLC layer processing relating to receiving data information, e.g., packets and/or frames, by way of wireless communication interface module 1308, e.g., from an end node to access node 1300. Uplink LLC (ARQ) module 1342 includes processing associated with ARQ capabilities, e.g., retransmission of lost packets or frames. In some embodiments, uplink LLC (ARQ) module 1342 further includes processing relating to an LLC header and/or trailer that encapsulates higher layer messages, e.g., packets, which provides additional functionality, e.g., multi-protocol multiplexing/demultiplexing through a type field or error detection by way of a checksum field. Uplink LLC (ARQ) module 1342 can also perform reassembly of frames received by uplink PHY/MAC module 1344 into higher layer messages, e.g., packets. The configuration information 1330 can include configuration information that affects the operation of uplink LLC (ARQ) module 1342, e.g., an ARQ window size, maximum number of retransmissions, a discard timer, etc.

Uplink PHY/MAC module 1344 controls PHY layer and MAC layer processing relating to receiving data information, e.g., packets and/or frames, by way of wireless communication interface module 1308, e.g., from an end node to access node 1300. In some embodiments, operation of uplink PHY/MAC module 1344 includes both sending and receiving control information, e.g., signals or messages, to coordinate receiving of data information, e.g., messages, packets, or frames. Configuration information 1330 can include configuration information that affects the operation of uplink PHY/MAC module 1344, e.g., a frequency, band, channel, spreading code or hopping code to be used for reception, an identifier associated with access node 1300, etc.

Downlink classifier module 1346 controls processing relating to identification of data information, e.g., messages, packets, and/or frames, as belonging to particular traffic flows prior to being sent through wireless communication interface module 1308, e.g., from access node 1300 to an end node. In some embodiments, messages, packets, and/or frames to be sent by way of wireless communication interface module 1308 are classified as belonging to one of a variety of traffic flows by downlink classifier module 1346 based on inspection of one or more header and/or payload fields. The results of classification by downlink classifier module 1346 can affect the treatment of the classified data information, e.g., messages, packets, and/or frames, by downlink queue management module 1350 and other modules 1348, 1352, and 1354, e.g., the results may determine a particular queue the message, packet, and/or frame will be associated with for storage and further affect subsequent processing such as scheduling. Configuration information 1330 can include configuration information, e.g., parameters settings, that affect the operation of downlink classifier module 1346, e.g., a set of one or more classifier filter rules that prescribe criteria used to associate data information, e.g., messages, packets, and/or frames, as belonging to one or more traffic flows.

Downlink traffic conditioner module 1348 controls processing relating to traffic conditioning, e.g., metering, marking, policing, etc., for data information, e.g., messages, packets, and/or frames, to be sent by way of wireless interface module 1308, e.g., from access node 1300 to an end node. Downlink traffic conditioner module 1348 can condition traffic, e.g., meter, mark and/or police, as a function of the quality of service requirements and/or constraints associated with one or more traffic flows and/or one or more end nodes. Configuration information 1330 can include configuration information that affects the operation of downlink traffic conditioner module 1348, e.g., a rate bound, and/or marking value associated with one or more traffic flows and/or end nodes.

Downlink queue management module 1350 maintains information and controls processing relating to storage of data information, e.g., messages, packets, and/or frames, to be sent by way of wireless communication interface module 1308, e.g., from access node 1300 to an end node. Downlink queue management module can control storage of data information awaiting transmission and maintain state information regarding data information awaiting transmission on a per traffic flow basis, e.g., packets associated with each traffic flow may be stored in separate queues. In some embodiments of, Downlink queue management module 1350 supports a variety of queue management techniques and/or capabilities, e.g., head drop, tail drop, as well as various AQM mechanisms such as RED. Configuration information 1330 can include configuration information that affects the operation of downlink queue management module 1350, e.g., a queue limit, drop strategy, and/or AQM thresholds associated with one or more traffic flows.

Downlink LLC (ARQ) module 1352 controls LLC layer processing relating to sending data information, e.g., messages, packets, and/or frames, by way of wireless communication interface module 1308, e.g., from access node 1300 to an end node. Downlink LLC (ARQ) module 1352 includes processing associated with ARQ capabilities, e.g., retransmission of lost packets or frames. In some embodiments, downlink LLC (ARQ) module 1352 further includes processing relating to the addition of an LLC header and/or trailer to higher layer messages, e.g., packets, to provide additional functionality, e.g., multi-protocol multiplexing/demultiplexing through a type field or error detection by way of a checksum field. Downlink LLC (ARQ) module 1352 can also perform fragmentation of higher layer messages, e.g., packets, into multiple sub-portions, e.g., frames to be sent by downlink PHY/MAC module 1354. Configuration information 1330 can include configuration information that affects the operation of downlink LLC (ARQ) module 1352, e.g., an ARQ window size, maximum number of retransmissions, a discard timer, etc.

Downlink PHY/MAC module 1354 controls PHY layer and MAC layer processing relating to sending data information, e.g., messages, packets, and/or frames, by way of wireless communication interface module 1308, e.g., from access node 1300 to an end node. In some embodiments, operation of downlink PHY/MAC module 1354 includes both sending and receiving control information, e.g., signals or messages, to coordinate sending of data information, e.g., messages, packets, or frames. Configuration information 1330 can include configuration information that affects the operation of downlink PHY/MAC module 1354, e.g., a frequency, band, channel, spreading code or hoping code to be used for transmissions, an identifier associated with the access node 1300, etc.

Figure 14:
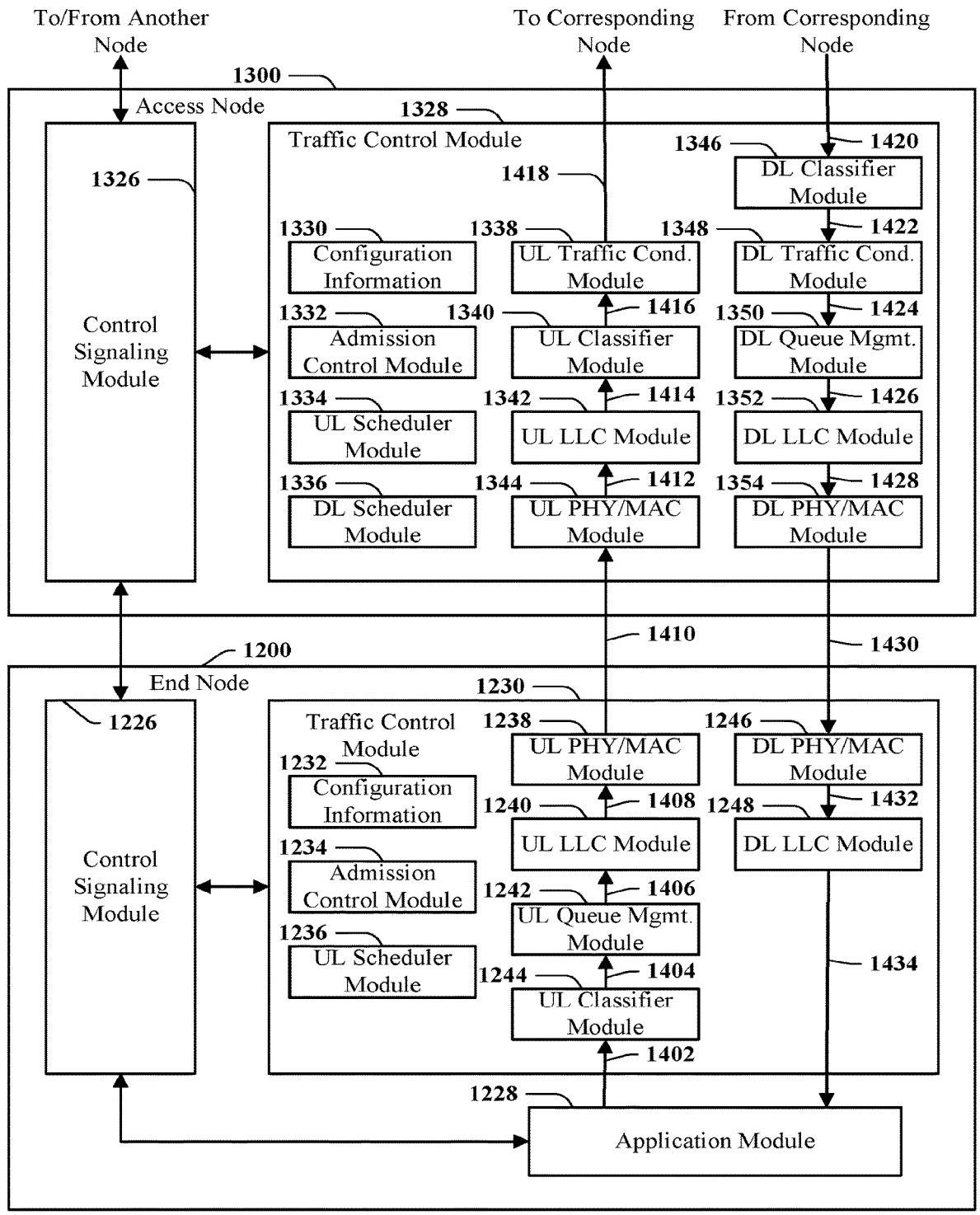
FIG. 14 illustrates an example end node communicating with an example access node.

FIG. 14 illustrates example signaling and traffic flows between various modules included in example end node 1200 and example access node 1300. The FIG. 14 end node 1200 and FIG. 14 access node 1300 are simplified representations of the FIG. 12 end node 1200 and FIG. 13 access node 1300, respectively. The FIG. 14 example shows application module 1228 sending and receiving data information, e.g., traffic flows comprising a sequence of messages, packets, or frames. In the context of the FIG. 11 example system, the FIG. 14 end node 1200 may be any one of end nodes 1102-1112 depicted in FIG. 11 and the application module 1228 included in the FIG. 14 end node 1200 may be exchanging data information with another node in the system, e.g., another end node 1102-1112 or the application server node 1126 as depicted in FIG. 11. In FIG. 14 and the subsequent description, the node with which the FIG. 14 end node 1200 is exchanging data information is referred to as the corresponding node.

The data information, e.g., traffic flows comprising a sequence of messages, packets, or frames, sent from the application module 1228 in the end node 1200 to a corresponding node is shown by a sequence of arrows 1402-1408 to proceed through a sequence of modules 1238-1244 included in end node 1200 for processing, after which the data information is sent from the end node 1200 to the access node 1300, e.g., by way of wireless communication interface module 1204. Following reception by access node 1300, e.g., by way of wireless communication interface module 1308, the data information, e.g., traffic flows comprising a sequence of messages, packets, or frames, sent from the application module 1228 in end node 1200 to the corresponding node is shown by a sequence of arrows 1410-1418 to proceed through a sequence of modules 1338-1344 included in access node 1300 for processing, prior to being forwarded from the access node 1300 toward the corresponding node, e.g., directed in accordance with routing information to an intermediate node connected to the access node by way of network/internetwork interface module 1306.

The data information, e.g., traffic flows comprising a sequence of messages, packets, or frames, sent from a corresponding node to application module 1228 in end node 1228 is shown by a sequence of arrows 1420-1428 to be received by access node 1300, e.g., by way of network/internetwork interface module 1306, and then to proceed through a sequence of modules 1346-1354 included in access node 1300 for processing, after which the data information is sent from the access node 1300 to the end node 1200, e.g., via the wireless communication interface module 1308. Following reception by end node 1200, e.g., by way of wireless communication interface module 1204, the data information, e.g., traffic flows comprising a sequence of messages, packets, or frames, sent from the corresponding node to application module 1228 in end node 1200 is shown by a sequence of arrows 1430-1434 to proceed through a sequence of modules 1246 and 1248 included in end node 1200 for processing, prior to being delivered to the application module 1228 in end node 1200.

In addition to the exchange of data information, e.g., traffic flows, FIG. 14 also depicts the exchange of control information, e.g., signaling flows and/or communication interfaces. In particular, the FIG. 14 example depicts the exchange of control information between control signaling module 1326 and traffic control module 1328 included in access node 1300. Similarly, the FIG. 14 example depicts the exchange of control information between control signaling module 1226 and the traffic control module 1230 included in the end node 1200. In both access node 1300 and end node 1200, exchange of control information between the modules as shown allows the respective control signaling module 1326/1226 in the access/end node 1300/1200 to affect, e.g., set, modify, and/or monitor, the configuration and/or operation of the various modules included in the respective traffic control module 1328/1230, as needed to provide the proper quality of service treatment of the data information, e.g., traffic flows, to/from the application module 1228 in the end node 1200.

The exchange of control information, e.g., signaling flows and/or communication interfaces, is also shown a) between another node and control signaling module 1326 in access node 1300, b) between application module 1228 in end node 1200 and control signaling module 1226 in end node 1200, and c) between the respective control signaling modules 1326/1226 in access node 1300 and end node 1200. These exchanges of control information, e.g., signaling flows and/or communication interfaces, enable the configuration and/or operation of traffic control modules 1328/1230 in both access node 1300 and the end node 1200 to be affected by a) one or more additional nodes, e.g. the access control node 1120 and/or application server node 1126, b) application module 1228 in end node 1200, or c) a combination of one or more additional nodes and the application module 1228 in end node 1200. Various embodiments of the present invention may, and do, support all or only a subset of the depicted control information exchanges as needed.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A communications method by a mobile device, comprising:

communicating over a first path between the mobile device and a first access point, wherein communication over the first path is associated with a first sequence number, and wherein the first sequence number is initiated when the mobile device registers with the first access point associated with the first path; and communicating over a second path between the mobile device and a second access point, wherein communication over the second path is associated with a second sequence number, wherein the second sequence number is initiated when the mobile device registers with the second access point associated with the second path, wherein the second sequence number is different from the first sequence number, and wherein the mobile device communicates over the first path and the second path simultaneously.

2. The method of claim 1, wherein:

communicating over the first path comprises communicating one or more first packets over the first path according to a messaging protocol, and communicating over the second path comprises communicating one or more second packets over the second path according to the messaging protocol.

3. The method of claim 2, wherein:

the first sequence number is employed as part of the messaging protocol for the one or more first packets communicated over the first path, and the second sequence number is employed as part of the messaging protocol for the one or more second packets communicated over the second path.

4. The method of claim 1, further comprising:

generating the first sequence number; and generating the second sequence number.

5. The method of claim 1, wherein:

the first sequence number is associated with the first access point, and the second sequence number is associated with the second access point.

6. The method of claim 1, wherein:

communicating over the first path comprises employing the first sequence number for the communication over the first path from a time the first path is established until a time when the first path is terminated; and communicating over the second path comprises employing the second sequence number for the communication over the second path from a time the second path is established until a time when the second path is terminated.

7. The method of claim 1, further comprising:

employing, by the mobile device, the first sequence number for further communication of the mobile device with the first access point through the first path; and employing the second sequence number for further communication of the mobile device with the second access point through the second path, the first sequence number and the second sequence number for ordering messages sent on the first path and the second path.

8. The method of claim 1, further comprising:

establishing a third path between the mobile device and a third access point; and communicating over the third path, wherein communication over the third path is associated with a third sequence number, and wherein the third sequence number is different from the first sequence number and the second sequence number.

9. The method of claim 8, further comprising:

performing a handover from the first path or the second path to the third path.

10. A mobile device, comprising:

a memory;

at least one transceiver; and at least one processor communicatively coupled to the memory and the at least one transceiver, the at least one processor configured to:
communicate, via the at least one transceiver, over a first path between the mobile device and a first access point, wherein communication over the first path is associated with a first sequence number, and wherein the first sequence number is initiated when the mobile device registers with the first access point associated with the first path; and
communicate, via the at least one transceiver, over a second path between the mobile device and a second access point, wherein communication over the second path is associated with a second sequence number, wherein the second sequence number is initiated when the mobile device registers with the second access point associated with the second path, wherein the second sequence number is different from the first sequence number, and wherein the mobile device communicates over the first path and the second path simultaneously.

11. The mobile device of claim 10, wherein:
communicate, via the at least one transceiver, over the first path comprises communicating one or more first packets over the first path according to a messaging protocol, and
communicate, via the at least one transceiver, over the second path comprises communicating one or more second packets over the second path according to the messaging protocol.

12. The mobile device of claim 11, wherein:
the first sequence number is employed as part of the messaging protocol for the one or more first packets communicated over the first path, and
the second sequence number is employed as part of the messaging protocol for the one or more second packets communicated over the second path.

13. The mobile device of claim 10, wherein the at least one processor is further configured to:
generate the first sequence number; and
generate the second sequence number.

14. The mobile device of claim 10, wherein:
the first sequence number is associated with the first access point, and
the second sequence number is associated with the second access point.

15. The mobile device of claim 10, wherein:
communicate, via the at least one transceiver, over the first path comprises employing the first sequence number for the communication over the first path from a time the first path is established until a time when the first path is terminated; and
communicate, via the at least one transceiver, over the second path comprises employing the second sequence number for the communication over the second path from a time the second path is established until a time when the second path is terminated.

16. The mobile device of claim 10, wherein the at least one processor is further configured to:
employ the first sequence number for further communication of the mobile device with the first access point through the first path; and
employ the second sequence number for further communication of the mobile device with the second access point through the second path, the first sequence number and the second sequence number for ordering messages sent on the first path and the second path.

17. The mobile device of claim 10, wherein the at least one processor is further configured to:
establish a third path between the mobile device and a third access point; and
communicate, via the at least one transceiver, over the third path, wherein communication over the third path is associated with a third sequence number, and wherein the third sequence number is different from the first sequence number and the second sequence number.

18. The mobile device of claim 17, wherein the at least one processor is further configured to:
perform a handover from the first path or the second path to the third path.

19. A mobile device, comprising:
means for communicating over a first path between the mobile device and a first access point, wherein communication over the first path is associated with a first sequence number, and wherein the first sequence number is initiated when the mobile device registers with the first access point associated with the first path; and
means for communicating over a second path between the mobile device and a second access point, wherein communication over the second path is associated with a second sequence number, wherein the second sequence number is initiated when the mobile device registers with the second access point associated with the second path, wherein the second sequence number is different from the first sequence number, and wherein the mobile device communicates over the first path and the second path simultaneously.

20. The mobile device of claim 19, wherein:
the means for communicating over the first path comprises means for communicating one or more first packets over the first path according to a messaging protocol, and
the means for communicating over the second path comprises means for communicating one or more second packets over the second path according to the messaging protocol.

21. The mobile device of claim 20, wherein:
the first sequence number is employed as part of the messaging protocol for the one or more first packets communicated over the first path, and
the second sequence number is employed as part of the messaging protocol for the one or more second packets communicated over the second path.

22. The mobile device of claim 19, wherein:
the first sequence number is associated with the first access point, and
the second sequence number is associated with the second access point.

23. The mobile device of claim 19, wherein:
the means for communicating over the first path comprises means for employing the first sequence number for the communication over the first path from a time the first path is established until a time when the first path is terminated; and
the means for communicating over the second path comprises means for employing the second sequence number for the communication over the second path from a time the second path is established until a time when the second path is terminated.

24. The mobile device of claim 19, further comprising:
means for employing the first sequence number for further communication of the mobile device with the first access point through the first path; and means for employing the second sequence number for further communication of the mobile device with the second access point through the second path, the first sequence number and the second sequence number for ordering messages sent on the first path and the second path.

25. The mobile device of claim 19, further comprising:
means for establishing a third path between the mobile device and a third access point; and
means for communicating over the third path, wherein communication over the third path is associated with a third sequence number, and wherein the third sequence number is different from the first sequence number and the second sequence number.

26. The mobile device of claim 25, further comprising:
means for performing a handover from the first path or the second path to the third path.

27. A non-transitory computer-readable medium storing computer-executable instructions, the computer-executable instructions comprising:

at least one instruction instructing a mobile device to communicate over a first path between the mobile device and a first access point, wherein communication over the first path is associated with a first sequence number, and wherein the first sequence number is initiated when the mobile device registers with the first access point associated with the first path; and at least one instruction instructing the mobile device to communicate over a second path between the mobile device and a second access point, wherein communication over the second path is associated with a second sequence number, wherein the second sequence number is initiated when the mobile device registers with the second access point associated with the second path, wherein the second sequence number is different from the first sequence number, and wherein the mobile device communicates over the first path and the second path simultaneously.

\* \* \* \* \*